(12) United States Patent
Muquit et al.

(10) Patent No.: US 8,396,259 B2
(45) Date of Patent: Mar. 12, 2013

(54) ELECTRONIC DEVICE HAVING BIOMETRIC AUTHENTICATION FUNCTION AND DATA MANAGEMENT METHOD

(75) Inventors: Mohammad Abdul Muquit, Tokyo (JP); Satoshi Amagai, Saitama (JP)

(73) Assignee: Sony Corporation, Tokyo (JP)

( * ) Notice: Subject to any disclaimer, the term of this patent is extended or adjusted under 35 U.S.C. 154(b) by 462 days.

(21) Appl. No.: 12/714,160

(22) Filed: Feb. 26, 2010

(65) Prior Publication Data
US 2010/0232653 A1 Sep. 16, 2010

(30) Foreign Application Priority Data
Mar. 10, 2009 (JP) ................ P2009-056975

(51) Int. Cl.
*G06K 9/00* (2006.01)
(52) U.S. Cl. ........ 382/115; 382/116; 382/117; 382/118; 382/124
(58) Field of Classification Search .............. None
See application file for complete search history.

(56) References Cited

U.S. PATENT DOCUMENTS

| 7,154,536 | B2* | 12/2006 | Kuwayama | 348/207.99 |
| 7,620,618 | B2* | 11/2009 | Tsukamoto | 1/1 |
| 2002/0080256 | A1* | 6/2002 | Bates et al. | 348/335 |
| 2008/0252412 | A1* | 10/2008 | Larsson et al. | 340/5.2 |
| 2011/0173235 | A1* | 7/2011 | Aman et al. | 707/792 |

FOREIGN PATENT DOCUMENTS
JP 2005-268951 9/2005
* cited by examiner

*Primary Examiner* — Claire X Wang
*Assistant Examiner* — David Perlman
(74) *Attorney, Agent, or Firm* — Finnegan Henderson Farabow Garrett & Dunner LLP

(57) ABSTRACT

An electronic device having a biometric authentication function is provided which includes a biometric authentication sensor for detecting a feature quantity of a living body, a user identification unit for identifying a user based on the feature quantity detected by the biometric authentication sensor at a time a specific operation is performed by the user, and a data storage unit for storing data acquired according to the specific operation in a specific folder corresponding to the user identified by the user identification unit.

14 Claims, 13 Drawing Sheets

APPLICATION TO IMAGING DEVICE

EXAMPLE OF FOLDER STRUCTURE

EXAMPLE OF FOLDER STRUCTURE
(IN CASE CLASSIFYING INTO GROUPS)

EXAMPLE OF DATA DISPLAY METHOD

ELECTRONIC DEVICE HAVING BIOMETRIC AUTHENTICATION FUNCTION AND DATA MANAGEMENT METHOD

BACKGROUND OF THE INVENTION

1. Field of the Invention

The present invention relates to an electronic device having a biometric authentication function and a data management method.

2. Description of the Related Art

In recent years, digitalization of electronic devices has progressed due to a drastic development in information processing technology and communication technology. Also, a reduction in the cost of digital devices has made digital devices widespread in homes. As a result, digital devices have come to be used in various situations in everyday life. For example, a digital still camera, a digital video camera, a portable music player, a mobile phone, a portable information terminal, a digital television, a digital video recorder and the like are currently widely used. Photograph data, video data, music data and the like are handled as digital data by these digital devices. Accordingly, a user can easily delete or edit the data, for example. Also, since data can be easily transferred from these digital devices to a personal computer (hereinafter, a "PC"), a user can manage the data on the PC or the like.

Furthermore, recently, due to the shrinking of the semiconductor manufacturing processes, a high capacity memory has become available at a low price. Thus, by equipping a digital camera or the like with a high capacity memory, a large amount of data can be recorded. As a result, a user is allowed to perform continuous shooting without worrying about the remaining capacity of memory, or to carry a large amount of music data. However, accumulation of large amount of data in the memory has made management of data difficult. Particularly, with a digital device shared by a plurality of users, data stored by a plurality of users are accumulated in the same memory, making a management for each user difficult. As a result, when using data accumulated in the memory, searching for desired data becomes burdensome.

Thus, previously, the burden has been aimed to be reduced by separating folders in which data are to be stored for each user, and having each user refer to his/her own folder at the time of storing or using data. However, with a small digital device with low operability, operation of creating a folder, transferring between folders, or transferring data to a user's own folder is burdensome in the first place. As a technology for reducing such operational burden, JP-A-2005-268951, for example, discloses a technology for associating a function with each finger of a user and performing a function associated with a finger that performed an operation. In this manner, by associating an operation function with each finger for each user, operational burden can be reduced.

SUMMARY OF THE INVENTION

However, in case of using the above-described technology, to sort data into a folder of a user, a folder transfer operation has to be performed with a finger associated with a folder transfer function, and a data transfer operation has to be performed with a finger associated with a data transfer function. Of course, each user has to create a folder with a finger associated with a folder creation function. Although the operational burden is reduced, operational steps are many and the operation relating to the sorting of data is still burdensome. Also, the number of fingers is limited, and thus, the number of functions to be associated is also limited. Even if a function is to be associated to a combination of a plurality of fingers, a user has to remember the correspondence relationship between the combination and the function, and thus, the burden on the user is still large.

Thus, in light of the foregoing, it is desirable to provide novel and improved electronic device having a biometric authentication function and data management method that enable easy management of data of each user with less operational steps.

According to an embodiment of the present invention, there is provided an electronic device having a biometric authentication function including a biometric authentication sensor for detecting a feature quantity of a living body, a user identification unit for identifying a user based on the feature quantity detected by the biometric authentication sensor at a time a specific operation is performed by the user, and a data storage unit for storing data acquired according to the specific operation in a specific folder corresponding to the user identified by the user identification unit.

Furthermore, the electronic device having a biometric authentication function may further include a detection times counter for counting a number of times a feature quantity of a same user is successively detected by the biometric authentication sensor at the time the specific operation is performed, based on a result of identification by the user identification unit, and a folder selection unit for selecting a specific folder in which the data is to be stored, according to the number of detection times counted by the detection times counter. In this case, the data storage unit stores the data in the specific folder selected by the folder selection unit.

Furthermore, the electronic device having a biometric authentication function may further include a body part identification unit for identifying a body part based on the feature quantity detected by the biometric authentication sensor. In this case, in case the number of detection times counted by the detection times counter is N (N≧2), the folder selection unit selects the specific folder according to the body part identified by the body part identification unit based on a feature quantity detected k-th (k=2, . . . , N) by the biometric authentication sensor.

Furthermore, in case the number of detection times counted by the detection times counter is N (N≧3), the folder selection unit may select the specific folder according to a combination and an order of N body parts sequentially identified by the body part identification unit.

Furthermore, the electronic device having a biometric authentication function may further include a group selection unit for selecting, based on group information defining a correspondence relationship between each user and a specific group, the specific group corresponding to the user identified by the user identification unit. In this case, the data storage unit stores data acquired according to the specific operation in a specific folder corresponding to the specific group selected by the group selection unit.

Furthermore, the electronic device having a biometric authentication function may further include a restriction setting unit for setting a display restriction or an operation restriction on a specific folder and data in the specific folder, the specific folder corresponding to a user other than the user identified by the user identification unit.

Furthermore, the data storage unit may store data acquired according to the specific operation in a common folder common to all users, and associate information on the data stored in the common folder with a specific virtual folder corresponding to the user identified by the user identification unit.

Furthermore, the feature quantity of a living body may be a feature quantity enabling to uniquely identify a user based on one or a combination of a vein pattern, a fingerprint and an iris pattern.

Furthermore, the electronic device having a biometric authentication function may further include an imaging unit for capturing an image of a subject, and an operation button for making the imaging unit perform an image capturing process. In this case, the user identification unit identifies a user based on the feature quantity detected by the biometric authentication sensor at a time the operation button is operated by the user. Also, the data storage unit stores data of the image that is captured by the imaging unit according to the operation of the operation button in a specific folder corresponding to the user identified by the user identification unit.

Furthermore, the electronic device having a biometric authentication function may further include a data acquisition unit for acquiring content data, and an operation button for making the data acquisition unit perform a data acquisition process. In this case, the user identification unit identifies a user based on the feature quantity detected by the biometric authentication sensor at a time the operation button is operated by the user. Also, the data storage unit stores the content data acquired by the data acquisition unit according to the operation of the operation button in a specific folder corresponding to the user identified by the user identification unit.

According to another embodiment of the present invention, there is provided an electronic device having a biometric authentication function including a biometric authentication sensor for detecting a feature quantity of a living body, a user identification unit for identifying a user based on the feature quantity detected by the biometric authentication sensor at a time a specific operation is performed by the user, an attribute assigning unit for assigning attribute information for the user identified by the user identification unit to data acquired according to the specific operation, and a data storage unit for storing in a specific folder the data to which the attribute information for the user is assigned by the attribute assigning unit.

Furthermore, the electronic device having a biometric authentication function may further include a display unit capable of displaying the data and information relating to the specific folder, and a display control unit for making the display unit display one or both of the specific folder and the data stored in the specific folder, the specific folder corresponding to the user identified by the user identification unit based on the feature quantity detected by the biometric authentication sensor at a time a display operation of the data is performed.

According to another embodiment of the present invention, there is provided a data management method including the steps of identifying, by using a biometric authentication sensor for detecting a feature quantity of a living body, a user based on the feature quantity detected by the biometric authentication sensor at a time a specific operation is performed by the user, and storing data acquired according to the specific operation in a specific folder corresponding to the user identified in the step of identifying.

According to another embodiment of the present invention, there is provided a data management method including the steps of identifying, by using a biometric authentication sensor for detecting a feature quantity of a living body, a user based on the feature quantity detected by the biometric authentication sensor at a time a specific operation is performed by the user, assigning attribute information for the user identified in the step of identifying to data acquired according to the specific operation, and storing in a specific folder the data to which the attribute information for the user is assigned in the step of assigning.

According to another embodiment of the present invention, there is provided a program capable of causing a computer to realize the functions of the information processing apparatus described above. Also, according to another embodiment of the present invention, there may be provided a recording medium in which the program is recorded, the recording medium being able to be read by a computer.

According to the embodiments of the present invention described above, data can be more easily managed for each user with less operational steps.

DETAILED DESCRIPTION OF THE EMBODIMENT(S)

Figure 1:
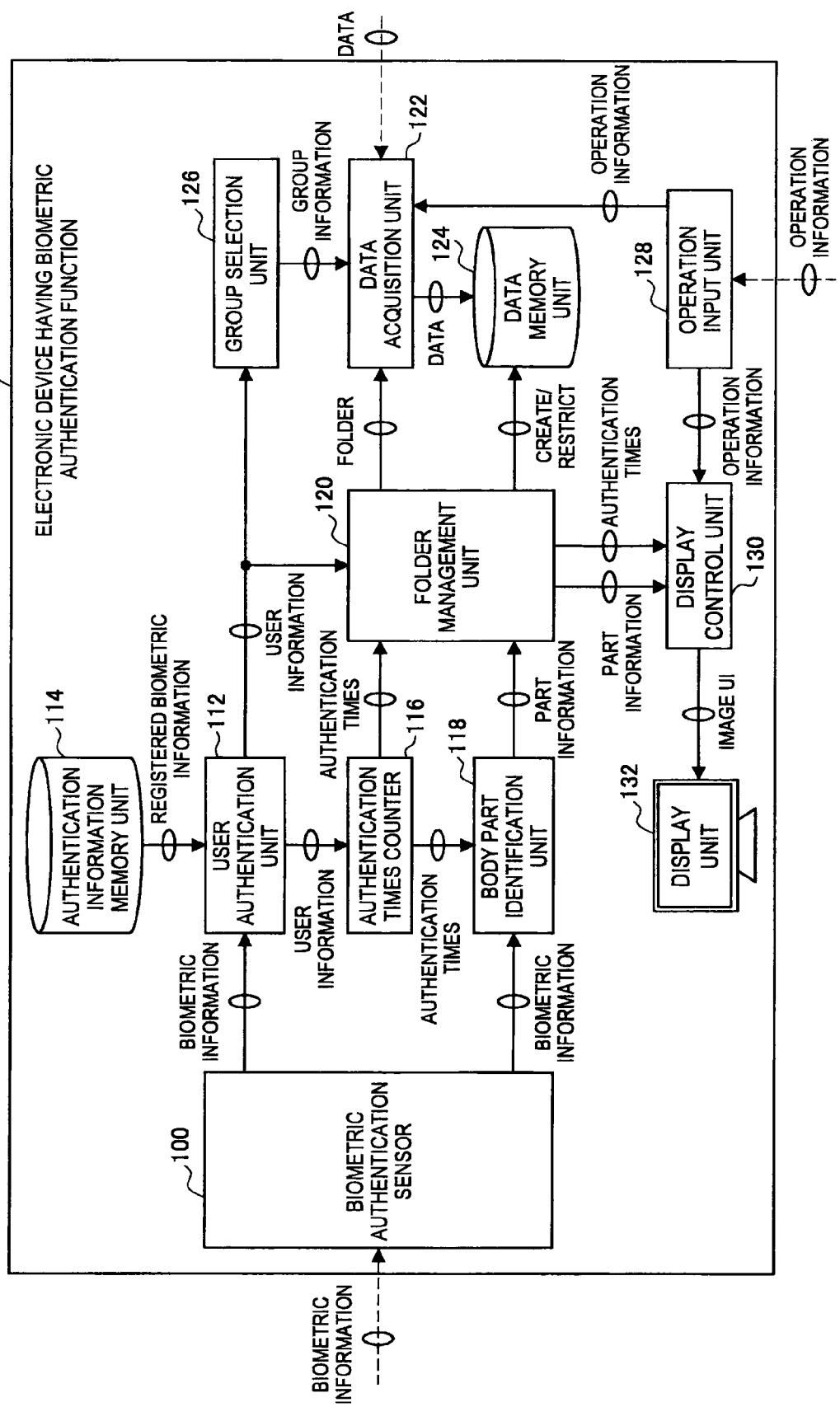
FIG. 1 is an explanatory diagram showing a functional configuration example of an electronic device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Explanation>

Here, a flow of explanation relating to an embodiment of the present invention described below will be briefly stated. First, referring to FIG. 1, a functional configuration of an electronic device 10 having a biometric authentication function (hereinafter, "electronic device 10) according to the present embodiment will be described. At the same time, referring to FIG. 2, a structure and an operation of a vein authentication sensor, which is a configuration example of a biometric authentication sensor 100, will be described. Furthermore, referring to FIGS. 3 and 4, concrete installation examples of the vein authentication sensor will be described. Furthermore, referring to FIGS. 5 and 6, a structure and an operation of a microlens array applicable to the biometric authentication sensor 100 will be described.

Figure 7:
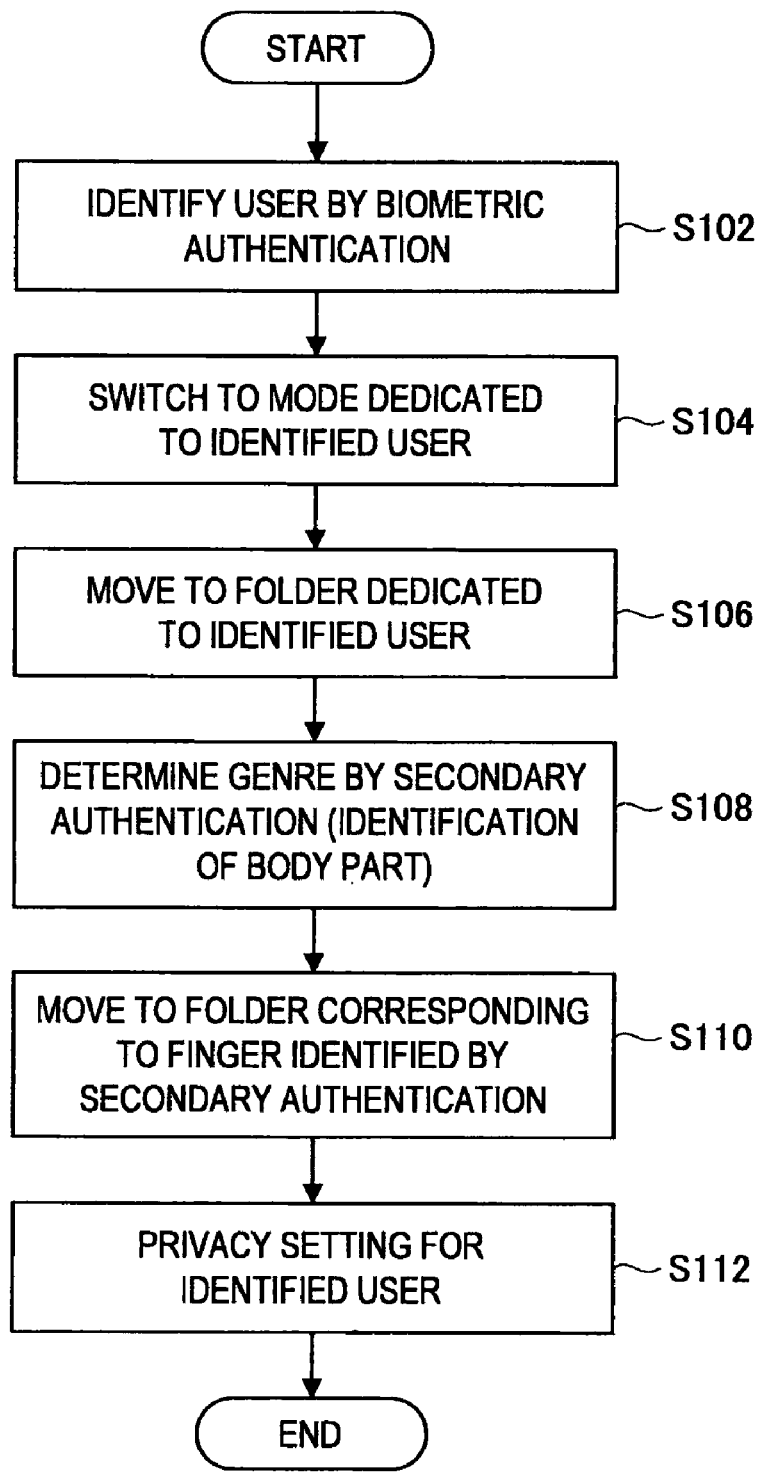
FIG. 7 is an explanatory diagram showing a flow of an overall process to be performed by a device of the present embodiment.

Next, referring to FIG. 7, regarding a data management method according to the present embodiment, a flow of overall process to be performed at the electronic device 10 will be described. Then, referring to FIG. 8, a flow of initial processes to be performed in the data management method will be described. Then, referring to FIGS. 9 to 11, a folder structure constructed and used in the data management method will be described. Then, referring to FIG. 12, a display method for data managed by the data management method will be described. Next, referring to FIG. 13, an example of a hardware configuration of the electronic device 10 will be described. Lastly, a technical idea of the present embodiment and effects obtained from the technical idea will be briefly described.

(Explanation Items)
1: Functional Configuration of Electronic Device 10 according to Present Embodiment
  1-1: Biometric Authentication Sensor 100
    1-1-1: Structure and Operation of Vein Authentication Sensor
    1-1-2: Installation Mode for Vein Authentication Sensor
    1-1-3: Structure of Microlens Array
  1-2: Structural Element relating to Folder Management Method
2: Process Flow of Data Management Method of Present Embodiment
3: Folder Structure Created or Used in Data Management Method of Present Embodiment
4: Display Method for Data Managed in Data Management Method of Present Embodiment
5: Hardware Configuration of Electronic Device 10
6: Conclusion Embodiment An embodiment of the present invention will be described. The present embodiment relates to a technology of distinguishing a user based on biometric information acquired from a specific body part and enabling management of data for each user. For example, this technology relates to a method of distinguishing a user based on the biometric information acquired at the time of the user performing an operation, and storing the data acquired according to the user operation in a folder corresponding to the user distinguished based on the biometric information. In the following, the functional configuration of the electronic device 10 capable of realizing the data management method according to such embodiment will be described. Additionally, the function of the electronic device 10 is realized by an information processing apparatus having the hardware configuration shown in FIG. 13.

1: Functional Configuration of Electronic Device 10

First, referring to FIG. 1, the functional configuration of the electronic device 10 according to the present embodiment will be described. FIG. 1 is an explanatory diagram showing a functional configuration example of the electronic device 10 according to the present embodiment.

As shown in FIG. 1, the electronic device 10 mainly includes a biometric authentication sensor 100, a user authentication unit 112, an authentication information memory unit 114, an authentication times counter 116, a body part identification unit 118, and a folder management unit 120. Furthermore, the electronic device 10 includes a data acquisition unit 122, a data memory unit 124, a group selection unit 126, an operation input unit 128, a display control unit 130, and a display unit 132. Additionally, the electronic device 10 can take the form of an imaging device, a music player, a PC, a mobile phone, a portable information terminal or the like, for example.

(1-1: Biometric Authentication Sensor 100)

When using the electronic device 10, a user inputs biometric information acquired from a specific body part by using the biometric authentication sensor 100, and a biometric authentication is performed. For example, a biometric pattern appearing in vein, fingerprint, iris, face, voiceprint or the like is used as the biometric information. Particularly, in the present embodiment, any biometric pattern having a characteristic shape unique to each user can be used.

The biometric authentication sensor 100 is means for acquiring the biometric pattern from a body part when a user nears or places a specific body part to/on a sensing area. The sensing area here is an area suitable for acquiring a biometric pattern from the placed body part. For example, the sensing area is provided between a light emitting means and an imaging means. In this case, the position of the sensing area is set so that light is efficiently emitted to the body part placed on the sensing area and light transmitted through the body part or light scattered within the body part efficiently enters the imaging means. The biometric pattern acquired by the biometric authentication sensor 100 is input as the biometric information to the user authentication unit 112 and the body part identification unit 118.

(1-1-1: Structure and Operation of Vein Authentication Sensor)

Figure 2:
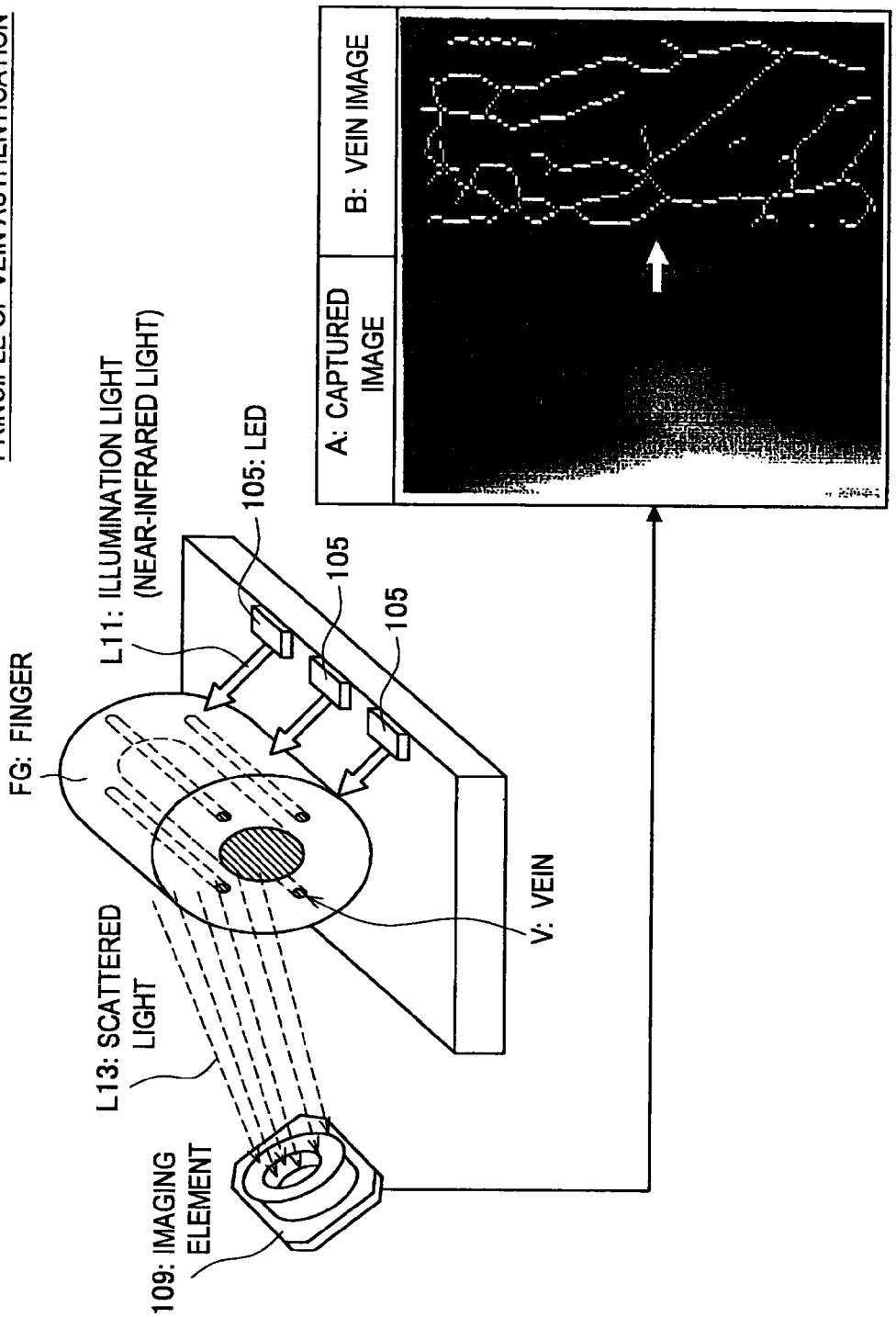
FIG. 2 is an explanatory diagram showing a configuration example of a biometric authentication sensor according to the present embodiment.

Here, referring to FIG. 2, the structure and operation of a vein authentication sensor will be concretely described while referring to the vein authentication sensor as an example of the biometric authentication sensor 100. FIG. 2 is an explanatory diagram showing the main structure and operation of the vein authentication sensor. Additionally, a captured image (A) of the body part (finger FG) acquired by the vein authentication sensor and a vein image (B) obtained by subjecting the captured image (A) to image processing are shown together in FIG. 2.

As shown in FIG. 2, the vein authentication sensor mainly includes a near-infrared light source (LED 105) and an imaging element 109. The vein authentication sensor captures an image of a body part (for example, a finger FG) placed on the sensing area (a mount or the like) and generates an image of the vein (vein image (B)) within the body part. Here, the LED is an abbreviation for Light Emitting Diode. Additionally, although the LED is used as the near-infrared light source in the example of FIG. 2, the application range of the present embodiment is not limited to such and a light source other than the LED may also be used.

The LED 105 is means for emitting near-infrared light in a specific wavelength band to the body part placed on the sensing area. The near-infrared light has a feature that it is well transmitted through body tissues and also that it is easily absorbed by hemoglobin (reduced hemoglobin) in blood. Accordingly, when the near-infrared light is emitted to a body part (for example, finger, palm, back of a hand, or the like), the vein distributed inside the body part is observed as a shadow. The shadow of the vein observed in this manner is referred to as a vein pattern. Additionally, the vein pattern is an example of the above-described biometric pattern. To suitably capture an image of the vein pattern, a near-infrared light in a specific wavelength band of approximately 600 nm to 1300 nm (preferably, approximately 700 nm to 900 nm) is preferably used.

For example, if the wavelength of the near-infrared light emitted from the LED 105 is less than 600 nm or more than 1300 nm, the percentage of light absorbed by hemoglobin in blood is reduced, and a suitable vein pattern is not obtained. On the other hand, if the wavelength of the near-infrared light emitted from the LED 105 is around 700 nm to 900 nm, the near-infrared light is specifically absorbed by both deoxygenated hemoglobin and oxygenated hemoglobin, and thus, a suitable vein pattern is obtained. Additionally, by combining the LED 105 capable of emitting light in the above-described wavelength band and a band pass filter (not shown) for passing the wavelength, a near-infrared light source capable of emitting the near-infrared light in such a wavelength band can be easily realized.

The near-infrared light emitted from the LED 105 in this manner (illumination light L11) is scattered over the vein inside the finger FG and enters the imaging element 109 as scattered light L13. Then, the imaging element 109 creates the captured image (A) by the incident scattered light L13. A charge coupled device (CCD) or a complementary metal oxide semiconductor (CMOS) is used as the imaging element 109, for example. The captured image (A) output from the imaging element 109 is subjected to specific image processing at an image processing unit not shown, and the vein image (B) is created. The specific image processing to be applied is an edge detection process, a smoothing process, a binarization process, a thinning process, or the like.

As described above, the vein authentication sensor emits the illumination light L11 on the finger FG by the LED 105, captures an image of the scattered light L13 transmitted through the inside of the finger FG, and subjects the captured image (A) to a specific image process to create the vein image (B). The vein image (B) created in this manner is input as biometric information to the user authentication unit 112 and the body part identification unit 118 (refer to FIG. 1). Additionally, it should be noted that the vein authentication sensor described here is only an example and the application range of the present embodiment is not limited to such.

(1-1-2: Installation Mode for Vein Authentication Sensor)

Figure 3:
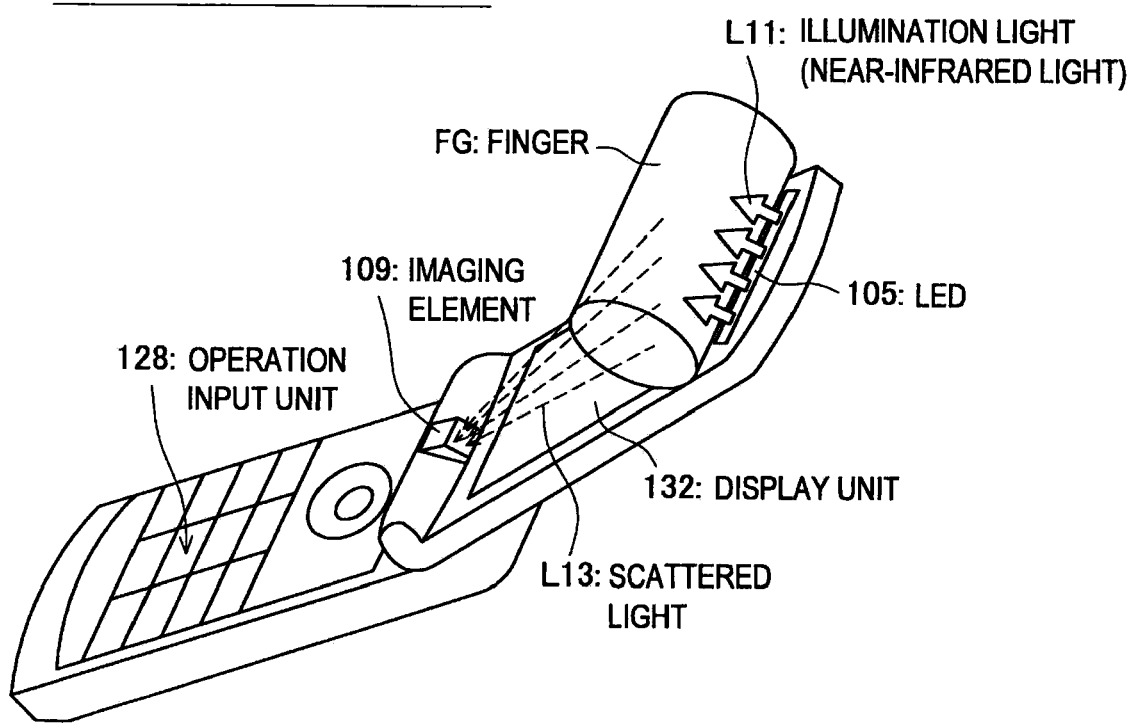
FIG. 3 is an explanatory diagram showing a configuration example of the electronic device according to the present embodiment.
Figure 4:
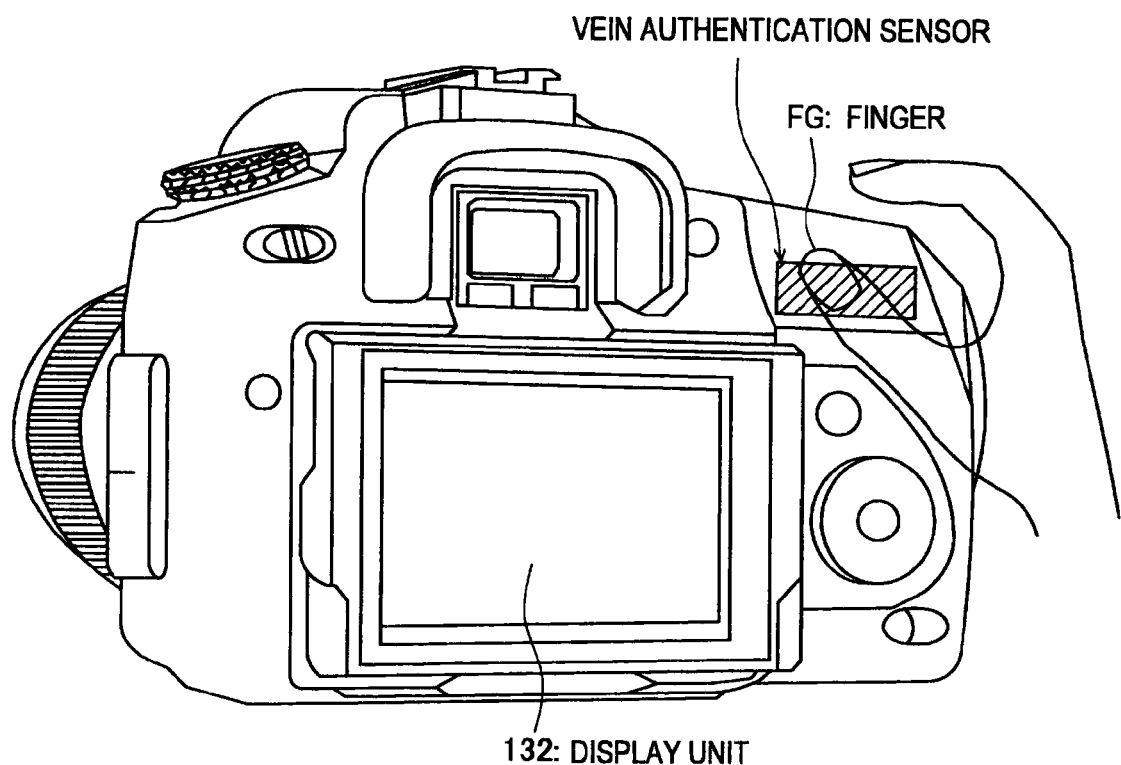
FIG. 4 is an explanatory diagram showing a configuration example of the electronic device according to the present embodiment.

Here, referring to FIGS. 3 and 4, an installation mode for the vein authentication sensor will be described. FIG. 3 is an explanatory diagram showing an installation mode for installing the vein authentication sensor in a mobile phone. FIG. 4 is an explanatory diagram showing an installation mode for installing the vein authentication sensor in an imaging device.

(Application to Mobile Phone)

First, reference will be made to FIG. 3. In case of installing the vein authentication sensor in a mobile phone, the position of the LED 105 and the position of the imaging element 109 should be carefully decided. That is, the positional relationship between the LED 105 and the imaging element 109 should be appropriately determined so that the scattered light L13 scattered within the finger FG enters the imaging element 109. In case of a mobile phone, since the housing itself is small and has a practically even surface, the positions at which the LED 105 and the imaging element 109 are to be provided are limited due to the circuit arrangement or from the viewpoint of design.

To overcome such a limitation, a configuration is used where the LED 105 is provided at the upper part of the display unit 132 and the imaging element 109 is provided at the hinge as shown in FIG. 3, for example. According to this installation mode, light is emitted from the LED 105 to the finger FG and the light scattered within the finger FG efficiently enters the imaging element 109. Furthermore, by providing the LED 105 and the imaging element 109 at positions as illustrated in FIG. 3, the vein authentication sensor can be mounted on the mobile phone without spoiling the design.

(Application to Imaging Device)

Next, reference will be made to FIG. 4. In the example of FIG. 3, the sensing area is provided at the upper part of the display unit 132 remote from the operation input unit 128. In case of such an installation mode, a user has to consciously place the finger FG on the sensing area and have vein authentication performed. Also, it is difficult to perform the vein authentication based on the biometric information acquired from a finger FG which is performing an operation. Thus, there is a possibility that the vein authentication is performed for the finger FG of a user different from the user performing the operation.

Thus, in the example of FIG. 4, a structure is proposed of providing the vein authentication sensor at a position on which the finger FG of the user operating the imaging device will be inevitably placed. In the example of FIG. 4, the vein authentication sensor is provided at a position on which the finger FG (or other body part) of the user will be inevitably placed at the time of pressing the shutter button of the imaging device. According to the installation mode as shown in FIG. 4, since the finger FG or the like of the operating user is inevitably placed on the sensing area at the time of the user performing the imaging operation, the user that performed the imaging operation can be easily identified by the biometric information acquired by the vein authentication sensor.

As described above, the installation mode is determined for the vein authentication sensor based on the shape of the electronic device 10 in which the vein authentication sensor is to be installed, the positional relationship between the operation components, or the like. In the present embodiment, the biometric information acquired by the vein authentication sensor is used to identify the user who is operating, and thus, the installation mode as illustrated in FIG. 4 is preferable. However, the electronic device 10 according to the present embodiment is not limited to the imaging device as illustrated in FIG. 4. The vein authentication sensor can also be provided to a music player, a mobile phone or the like at a position from which the biometric information can be acquired from the body part of the user during an operation, by taking into account the positional relationship between the operation input unit 128 and the sensing area. Accordingly, the technology according to the present embodiment can also be applied to a music player, a mobile phone, or the like.

(1-1-3: Structure of Microlens Array)

Figure 5:
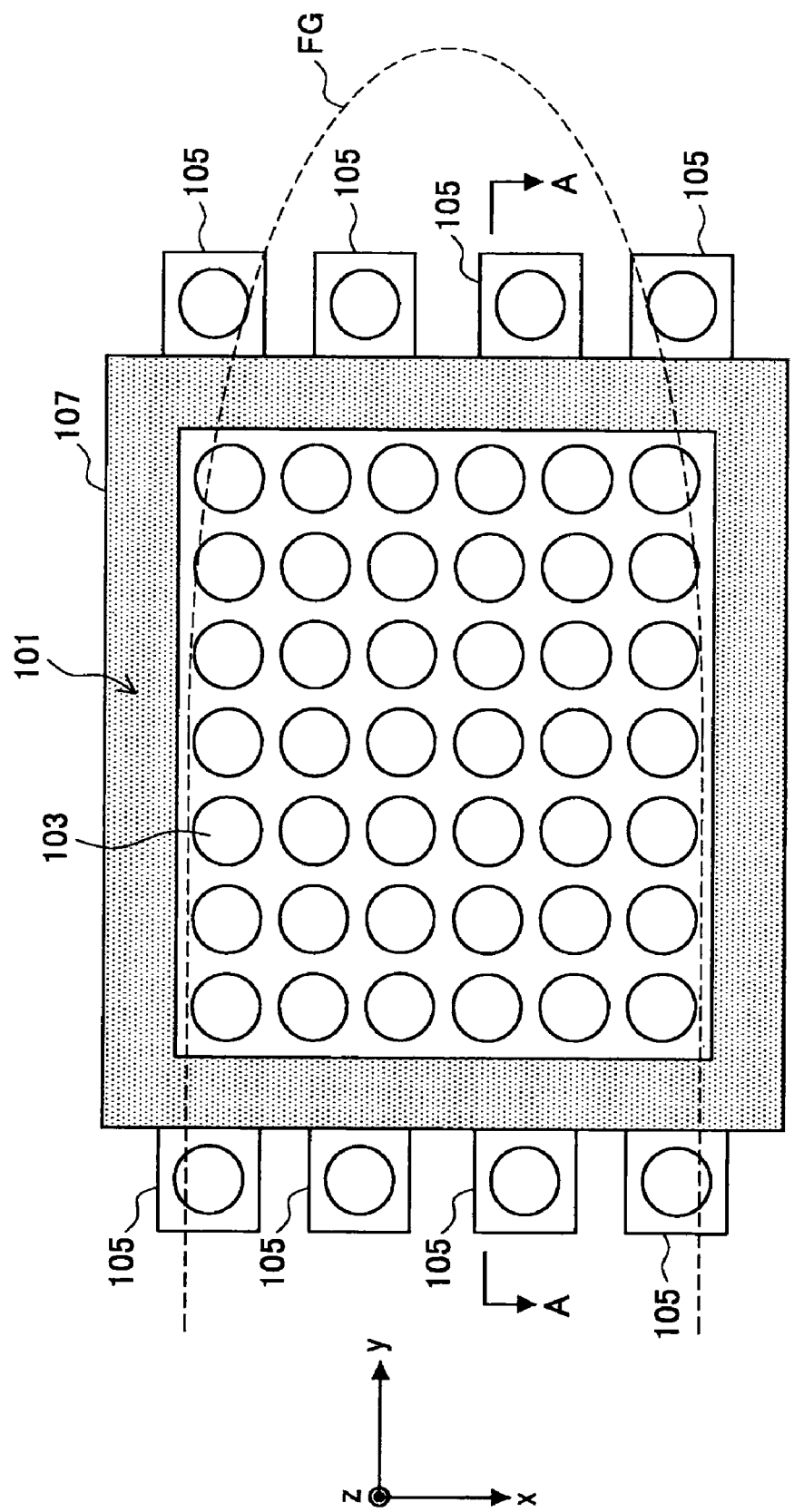
FIG. 5 is an explanatory diagram showing a configuration example of the biometric authentication sensor according to the present embodiment.
Figure 6:
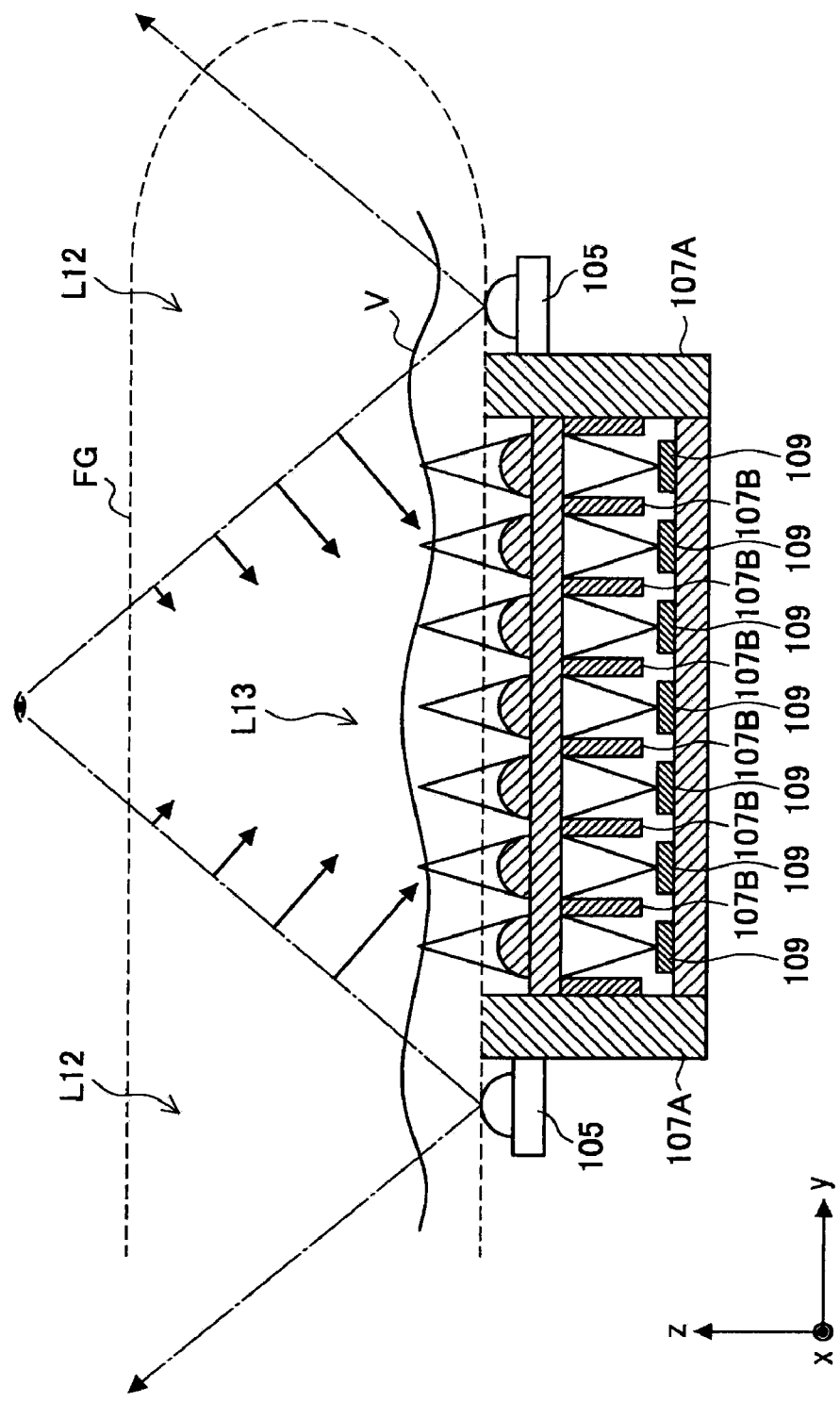
FIG. 6 is an explanatory diagram showing a configuration example of the biometric authentication sensor according to the present embodiment.

Here, referring to FIGS. 5 and 6, a configuration of applying a microlens array 101 to the vein authentication sensor will be described. The microlens array 101 is means for collecting the near-infrared light that transmitted through a living body onto the imaging element 109. By using the microlens array 101 as illustrated in FIGS. 5 and 6, a more accurate vein pattern can be obtained, and also, the vein authentication sensor can be miniaturized. FIG. 5 is a plan view of a vein authentication sensor including the microlens array 101. FIG. 6 is a cross-sectional view showing a cross section along the line A-A in FIG. 5.

(Structure of Microlens Array 101)

First, the structure of the microlens array 101 will be described. As shown in FIG. 5, the microlens array 101 is formed from a plurality of microlenses 103 arranged in a lattice pattern on a given substrate. Also, each microlens 103 guides the scattered light L13 transmitted through the finger FG to the imaging element 109. The microlens array 101 is a lens array with a small curvature of field and a small distortion in the depth direction. Thus, a desirable image data can be obtained by using the microlens array 101.

Additionally, the focal position of each microlens 103 is set at a position in the vein layer where a vein V within the finger FG exists. Human skin has a there-layer structure of an epidermal layer, a dermal layer and a subcutaneous layer. The vein layer mentioned above exists in the dermal layer. The dermal layer exists at a position about 0.1 mm to 0.3 mm from the surface of a finger with a thickness of about 2 mm to 3 mm. Thus, the focal position of the microlens 103 is set to be at a position about 1.5 mm to 2.0 mm from the surface of a finger with the existing position of the dermal layer as the reference. By setting the focal position to be such, the light transmitted through the vein layer can be efficiently collected onto the imaging element 109.

Additionally, the number of the microlenses 103 arranged in the microlens array 101 is not limited to the example shown in FIG. 5. The number of the microlenses 103 is arbitrarily changed according to the size of a living body whose image is to be captured or the size of the imaging element 109, for example.

(Arrangement Structure of LED 105)

Next, the arrangement structure of the LED 105 will be described. As shown in FIG. 5, a plurality of the LEDs 105 are arranged in pairs of rows, each pair facing each other with the microlens array 101 in-between. The pair of rows of the LEDs 105 is preferably arranged to face each other in the longitudinal direction of the finger FG. Adopting such arrangement mode enables the near-infrared light to be emitted at the upper and lower positions of the finger FG. Additionally, the number of the LEDs 105 included in each row is changed as appropriate according to the size of the microlens array 101, an illumination area of the LED 105, or the like. Furthermore, a directivity control plate 107A is provided between the microlens array 101 and the LED 105. The directivity control plate 107A is means for controlling the directivity of direct light L12 emitted from the LED 105 so that the direct light L12 does not directly enter the microlens 103.

(Light Guiding Properties of Directivity Control Plate 107B and Light Path)

Here, the light guiding properties of the directivity control plate 107B, and the light path of light emitted from the LED 105 to the finger FG will be described.

As shown in FIG. 6, the near-infrared light emitted from the LED 105 propagates upward towards the surface of the finger FG and enters the finger FG as the direct light L12. Human body is a suitable scatterer for the near-infrared light, and thus, the direct light L12 that entered the finger FG is scattered in all directions. Part (scattered light L13) of the scattered light is transmitted through the vein layer at which the vein V exists from the back of the finger FG to the front surface. The scattered light L13 transmitted through the vein V enters the microlens array 101. The directivity control plate 107B is provided at the boundary of adjacent microlenses 103. Thus, the directivity of the scattered light L13 emitted from the finger FG is controlled by the directivity control plate 107B and the scattered light L13 is selectively collected at the imaging element 109.

As described above, a desirable image data of a vein pattern can be obtained by using the microlens array 101 with a small curvature of field and a small distortion in the depth direction. Authentication accuracy can be further improved in the present embodiment by using a vein authentication sensor including the microlens array 101 as described.

Heretofore, the biometric authentication sensor 100 has been described in detail with the vein authentication sensor as an example. However, the application range of the technology according to the present embodiment is not limited to the vein authentication technology. For example, it can be applied to any biometric authentication technology capable of performing an authentication process by using a biometric pattern. However, the vein authentication technology has a higher authentication accuracy compared with a fingerprint authentication technology, an iris authentication technology or the like, and also, is resistant to tampering such as impersonation. Furthermore, the vein authentication technology can easily be implemented in small digital devices by adopting the above-described microlens array 101. Thus, although various biometric authentication technologies can be applied to the present embodiment, the vein authentication sensor as described above is preferably used.

(1-2: Structural Element Relating to Folder Management Method)

Reference will be again made to FIG. 1. In the following, the functions of the structural elements of the electronic device 10 relating to a folder management method according to the present embodiment will be described. As described above, when biometric information is acquired by the biometric authentication sensor 100, the biometric information is input from the biometric authentication sensor 100 to the user authentication unit 112 and the body part identification unit 118.

(User Authentication Unit 112, Authentication Information Memory Unit 114)

First, the user authentication unit 112 performs an authentication process by comparing the biometric information input from the biometric authentication sensor 100 and registered biometric information stored in the authentication information memory unit 114. Biometric information registered by each user in advance is stored in the authentication information memory unit 114. Thus, in case the user who input the biometric information is a registered user, the user authentication unit 112 can identify the user from among registered users. User information on the registered user identified by the user authentication unit 112 is input to the authentication times counter 116, the folder management unit 120 and the group selection unit 126.

(Authentication Times Counter 116)

As described above, the user information is input to the authentication times counter 116 from the user authentication unit 112. Thus, the authentication times counter 116 counts the number of times of the authentication operations successively performed by the same user, based on the input user information. For example, when the authentication operation is performed for the first time by a registered user U1, the biometric information on the user U1 acquired by the biometric authentication sensor 100 is input to the user authentication unit 112, and the user U1 is identified. Then, the user information indicating the user U1 is input to the authentication times counter 116.

When the user information is input, the authentication times counter 116 compares the user information that was previously input and the user information input this time. Also, the authentication times counter 116 stores the user information input this time in preparation for the comparison process with the user information which will be input next. The authentication times counter 116 increments the counter when the previous and the current user information are decided to be the same as a result of the comparison process, and resets the counter to 1 when they are decided to be different. In the above-described example, since the authentication operation by the user U1 is performed for the first time, the authentication times counter 116 resets the counter to 1.

For example, when a second authentication operation is performed successively by the user U1, the biometric information is input from the biometric authentication sensor 100 to the user authentication unit 112, and the user information on the user U1 is input from the user authentication unit 112 to the authentication times counter 116. In this case, the authentication times counter 116 has stored, at the time of the user U1 performing the authentication process for the first time, the user information on the user U1 as the previously input user information. Thus, the authentication times counter 116 decides that the previously input user information and the currently input user information are the same, and increments the counter. That is, the counter at this time point is 2.

Then, when a registered user U2 different from the user U1 performs the authentication process, user information on the user U2 is input to the authentication times counter 116. At this time, the authentication times counter 116 has the user information on the user U1 stored as the previously input user information. Thus, the authentication times counter 116 decides that the previously input user information and the currently input user information are different, and resets the counter to 1. With the count process as described, the number of times the same user performs the authentication operation in succession can be counted. The count value relating to the number of times of authentications by the same user counted by the authentication times counter 116 is input to the body part identification unit 118 and the folder management unit 120.

(Body Part Identification Unit 118)

As described above, the biometric information is input to the body part identification unit 118 from the biometric authentication sensor 100, and the number of authentication times is input thereto from the authentication times counter 116. Then, when the number of authentication times that is input is 2 or more, the body part identification unit 118 identifies the body part used for inputting the biometric information based on the input biometric information. For example, when the body part that can be detected by the biometric authentication sensor 100 is a finger, the body part identification unit 118 will have feature quantities of a plurality of fingers held therein and will identify to which finger the biometric information input from the biometric authentication sensor 100 belongs. Additionally, the feature quantity of a body part may be stored in the authentication information memory unit 114.

The types of body parts that can be identified by the body part identification unit 118 include (1) the finger type described above, (2) distinction between the back of a hand and a palm, (3) distinction between a right eye and a left eye, or the like. When the biometric information acquired by the biometric authentication sensor 100 is a fingerprint pattern, (1) mentioned above can be used. Also, when the biometric information is a vein pattern, (2) mentioned above can be used in addition to (1). Furthermore, when the biometric information is an iris pattern, (3) mentioned above can be used. In this manner, the type of the body part that can be distinguished may be arbitrary changed according to the type of a biometric pattern to be acquired by the biometric authentication sensor 100.

Furthermore, if a biometric authentication sensor 100 that can simultaneously acquire a plurality of types of biometric information is used, a body part can be identified based on biometric information different from the biometric information used for the user authentication by the user authentication unit 112. For example, when a biometric authentication sensor 100 capable of simultaneously acquiring a vein pattern and a fingerprint pattern is used, the user authentication can be performed based on the vein pattern, and the type of finger can be identified based on the fingerprint pattern. Information on the body part identified by the body part identification unit 118 in this manner (hereinafter, "part information") is input to the folder management unit 120. Additionally, in the following explanation, when the same user performs the authentication operation N times ($N \geq 2$) in a row, the authentication operation performed for the second time or later may be referred to as a secondary authentication.

(Folder Management Unit 120, Data Memory Unit 124)

As described above, the user information is input to the folder management unit 120 from the user authentication unit 112, the number of authentication times is input thereto from the authentication times counter 116, and the part information is input thereto from the body part identification unit 118. The folder management unit 120 changes the folder in which data is to be stored, or creates a folder in the data memory unit 124, according to the number of authentication times and the part information that are input. Also, the folder management unit 120 sets an access restriction on a part or all of the folders created in the data memory unit 124 or releases the access restriction, according to the number of authentication times and the part information that are input. Furthermore, the folder management unit 120 may be configured to input the number of authentication times and the part information to the display control unit 130, and to link folder management and display control.

Furthermore, the folder management unit 120 may hold the number of authentication times and the part information in association with each other. In this case, information on a body part identified at the time of a k-th ($k=2, \ldots, N$; N is the number of times the authentication operation is performed by the same user in succession) authentication operation performed is held. Also, when the same user performs the authentication operation N times in a row, a combination of body parts sequentially identified by the body part identification unit 118 and information on the order of identification will be held. Using the information allows the folder management unit 120 to create folder in a lower hierarchy based on the combinations of body parts sequentially input and the information on the input order, or to perform a setting process for an access restriction on the folder in the lower hierarchy or for a releasing of the same.

For example, when a first authentication operation is performed by the user U1, the user information indicating the user U1 is input to the folder management unit 120 from the user authentication unit 112, and the number of authentication times=1 is input thereto from the authentication times counter 116. In this case, based on the user information input from the user authentication unit 112, the folder management unit 120 moves the storage location for data acquired by the data acquisition unit 122 to a root folder of the user U1. The root folder here is the highest folder in the hierarchy of folders assigned to the user U1. Furthermore, the folder management unit 120 releases the access restriction set on the folders of the user U1 and sets the access restriction on the folders of other users.

Additionally, in case an access right is set in advance, the folder management unit 120 releases, for a user identified by the user information input from the user authentication unit 112, the access restriction on a folder for which the access right is granted. Setup information on the access right is stored in an access right setup file held by the folder management unit 120, for example. The type of the access right may be the grant or non-grant of a read permission or the grant or non-grant of a write permission to the folders of each user. Accordingly, an accessing user, folders of each user and the grant or non-grant of a read permission or the grant or non-grant of a write permission are written in the access right setup file in association with each other. The folder management unit 120 refers to the above-described access right setup file when user information is input from the user authentication unit 112, and sets an access restriction on the folders of each user.

Next, when a second authentication operation (secondary authentication) is performed by the user U1, the user information indicating the user U1 is input to the folder management unit 120 from the user authentication unit 112, and the number of authentication times=2 is input thereto from the authentication times counter 116. Also, part information is input to the folder management unit 120 from the body part identification unit 118. When these information are input, the folder management unit 120 creates a folder corresponding to the part information in the lower hierarchy of the root folder of the user U1, or moves the storage location for data to the folder in the lower hierarchy corresponding to the part information, for example. For example, when a genre of data is associated with a body part, a genre corresponding to part information is selected, and a folder corresponding to the genre is created in the lower hierarchy of the root folder.

Correspondence relationship between the part information and a folder attribute (for example, a genre) is written in a folder attribute file held by the folder management unit 120. For example, in the folder attribute file, "thumb," "middle finger" and "ring finger" are written in association with "rock," "pops" and "classical music," respectively. This example relates to music data. However, when relating to image data, a "palm" is written in association with "individual photography," and the "back of a hand" is written in association with "group photography," for example. Accordingly, when the user U1 performed the second authentication operation with the "palm," the folder management unit 120 refers to the folder attribute file, creates an "individual photography" file in the lower hierarchy of the root folder, and moves the storage location for data to the "individual photography" folder. However, in case the "individual photography" already exists, the folder management unit 120 performs only the movement process of the data storage location.

Next, when a third authentication operation (secondary authentication) is performed by the user U1, the user information indicating the user U1 is input to the folder management unit 120 from the user authentication unit 112, and the number of authentication times=3 is input thereto from the authentication times counter 116. Also, part information is input to the folder management unit 120 from the body part identification unit 118. When these information are input, the folder management unit 120 creates a folder corresponding to the part information in the lower hierarchy of the root folder of the user U1, or moves the storage location for data to the folder in the lower hierarchy corresponding to the part information, for example. For example, when a genre of data is associated with a body part, a genre corresponding to part information is selected, and a folder corresponding to the genre is created in the lower hierarchy of the root folder.

However, at the time of the third authentication operation, the folder management unit 120 already holds the part information acquired at the time of the second authentication operation. Thus, the folder management unit 120 can determine the folder attribute of a folder to be created in the lower hierarchy of the root folder, based on the two pieces of part information acquired at the time of the second and third authentication operations. For example, when the second part information is "thumb" and the third part information is "middle finger," information on the combination of the body parts "thumb"+"middle finger" and the sequential order (second, third)=("thumb," "middle finger") can be used as a reference for determining the folder attribute. Whichever is to be used as the reference for determination is set in advance by each user or set in advance by the provider of the electronic device 10.

Additionally, the determination process for the folder attribute is performed based on the folder attribute file held by the folder management unit 120. In the folder attribute file, information on the combination of body parts and each folder attribute are written in association with each other, or information on the combination of body parts, the information also including the sequential order, and each folder attribute are written in association with each other. For example, "male vocal" is written in association with "thumb"+"middle finger," and "female vocal" is written in association with "middle finger"+"ring finger." This example relates to a combination. However, when relating to a combination including the sequential order, "family" is written in association with (second, third)=("palm," "back of a hand"), and "friend" or the like is written in association with ("back of a hand," "palm"), for example.

Furthermore, a folder to be created according to a third or later authentication operation may be created in the lower hierarchy of a folder which was created or has become the movement destination according to the second authentication operation. In this case, the folder management unit 120 creates a folder having a folder attribute determined according to the third authentication operation in the lower hierarchy of the folder which was created or has become the movement destination by the second authentication operation, and moves a data storage location to the folder. However, when a folder having the folder attribute determined according to the third authentication operation already exists, the folder management 120 performs only the movement process of the data storage location.

Additionally, also in case of a fourth or later authentication operation, a folder creation process and a between-folder movement process are performed as with the process performed according to the third authentication operation described above. However, for the fourth or later time, the combination of body parts or the combination including the sequential order becomes more complicated than the third time. Thus, the folder management unit 120 may be configured to make the display unit 132 display, after performing a folder operation according to each authentication operation, a list of processes (folder attribute) to be performed in case each of the body parts is used in the next authentication operation. With this configuration, a user does not have to remember the correspondence relationship between a combination of body parts and a folder attribute, and thus, the trouble of the user can be saved.

As described above, the folder management unit 120 performs a folder creation process and a movement process of a data storage location based on the user information, the number of authentication times and the part information. Additionally, the root folder of each registered user is automatically created by the folder management unit 120 at the time of user registration. Also, when a group is to be registered, a folder for group is automatically created by the folder management unit 120 at the time of a group registration. For example, when a group "family" is registered, the folder management unit 120 automatically creates a folder for the group "family" in a hierarchy same as that of the root folder of each user. With this configuration, a user can easily create a desired folder without using the operation input unit 128, or can store data in a desired folder.

Additionally, explanation has been made mainly on the folder creation process and the data storage location movement process as the functions of the folder management unit 120. However, the folder management unit 120 may be configured to perform processes such as deletion of a folder, setting of an access right and movement of data, based on the user information, the number of authentication times and the part information. For example, when a second authentication operation is performed, it may be configured so that an access right is set for the folder which has become the movement destination according to the first authentication operation. With this configuration, the setting of an access right can be completed in a series of authentication operations, and thus, the operational steps of a user can be reduced.

(Data Acquisition Unit 122, Data Memory Unit 124, Operation Input Unit 128)

Next, an explanation will be made on the data acquisition unit 122. The data acquisition unit 122 is means for acquiring data and storing the acquired data in the data memory unit 124. As described above, folder information indicating the data storage location is input to the data acquisition unit 122 from the data management unit 120. Thus, the data acquisition unit 122 stores data in a folder in the data memory unit 124 indicated by the folder information input from the folder management unit 120. Additionally, the data acquisition unit 122 acquires data according to a data acquisition request input via the operation input unit 128 by a user, and stores the acquired data in the data memory unit 124.

For example, when the electronic device 10 is an imaging device, the data acquisition unit 122 is an imaging means, and the operation input unit 128 is a shutter button, various operation buttons or the like. In this case, the data acquisition unit 122 acquires as the image data an image of a subject acquired through the optical system, and stores the same in the data memory unit 124. That is, the data acquisition unit 122 acquires the light reflected by the subject through the optical system, converts the same to an electric signal by using a photoelectric conversion element, and then, acquires the image data in the form of digital data by using an A/D conversion element. Also, when the electronic device 10 is a music player, the data acquisition unit 122 acquires music data via an external device or a network, and stores the same in the data memory unit 124. Furthermore, when the electronic device 10 is a PC, a mobile phone or the like, the data acquisition unit 122 acquires image data, music data, text data, application data or the like through a wired or wireless network or the like, and stores the same in the data memory unit 124.

(Group Selection Unit 126, Data Acquisition Unit 122)

Next, an explanation will be made on the group selection unit 126. As described above, user information is input to the group selection unit 126 from the user authentication unit 112. When there are a plurality of registered groups, the group selection unit 126 selects a belonging group of a user indicated by the input user information. For this purpose, the group selection unit 126 holds a group registration file in which information on a registered group to which each registered user belongs is written. For example, in the group registration file, a group "family" is written in association with the user U1 and a group "friend" is written in association with the user U2. Thus, when the user information input from the user authentication unit 112 is for the user U1, the group selection unit 126 selects the group "family" as the belonging group of the user U1. Information on the group selected by the group selection unit 126 is input to the data acquisition unit 122.

Additionally, at the time a group is registered, a folder for the registered group is created in the data memory unit 124 by the folder management unit 120. Thus, when group information is input from the group selection unit 126, the data acquisition unit 122 stores the acquired data in the folder of the registered group indicated by the group information. Also, in case of the setting of storing data in both a personal folder and a group folder, the data acquisition unit 122 stores data in the folder of the registered group indicated by the group information and a folder specified by the folder management unit 120. The above-described setting relating to a storage folder is set in advance for each user and the setup information is held by the data acquisition unit 122, for example.

(Display Control Unit 130, Display Unit 132)

Next, an explanation will be made on the display control unit 130. The display control unit 130 is means for displaying on the display unit 132 a user interface to be used for the operation input by a user and the data and the folder stored in the data memory unit 124. Also, information such as the part information, the number of authentication times or the like is input to the display control unit 130 via the folder management unit 120. The display control unit 130 changes, according to the information, the structure of menu items displayed as the user interface, and the method for displaying the data, folder or the like.

Furthermore, when an access restriction to a folder or a menu item is applied by the folder management unit 120, the display control unit 130 hides the folder or the menu item to which the access restriction is applied, or displays the same in a predetermined colour. The display unit 132 is subjected to a control by the display control unit 130, and displays a user interface on a screen or displays data, folder or the like thereon. Additionally, in case of using a touch panel as the display unit 132, the display unit 132 and the operation input unit 128 are configured as an integrated display/input device.

Heretofore, the functional configuration of the electronic device 10 according to the present embodiment has been described. As described above, the electronic device 10 according to the present embodiment has the function of performing the folder management based on the biometric information of a user and of automatically sorting data into folders corresponding to the respective users. Also, the electronic device 10 according to the present embodiment has the function of automatically creating folders of various folder attributes according to the secondary authentication operation and of automatically sorting data into the folders. As described, due to the automatic creation of folders and automatic movement between folders, operational steps of a user can be reduced, and at the same time, a classification and storage of data desired by a user can be realized for each user, group and genre.

(Application to Read Process)

Additionally, in the above-described explanation, a configuration for classifying and storing data by the electronic device 10 according to the present embodiment has been described. However, the technology of the electronic device 10 according to the present embodiment can also be applied to a method for reading data. For example, when reading data, the folder management unit 120 of the electronic device 10 identifies a user based on the biometric information acquired by the biometric authentication sensor 100, and moves the data source to the folder of the identified user.

Also, when a secondary authentication is performed, the folder management unit 120 moves the data source to the same folder as the folder created at the time of classifying and storing data or as the folder which has become the movement destination. Furthermore, at the time of reading data, the folder management unit 120 sets the access right for each folder based on the user information, the number of authentication times and the part information, and limits the folders from which data can be read. With this configuration, the data source can be automatically moved to a desired folder at the time of reading data, and the operational steps of a user can be reduced and the operational burden of the user occurring at the time of searching for desired data can be reduced.

2: Process Flow of Data Management Method

Figure 8:
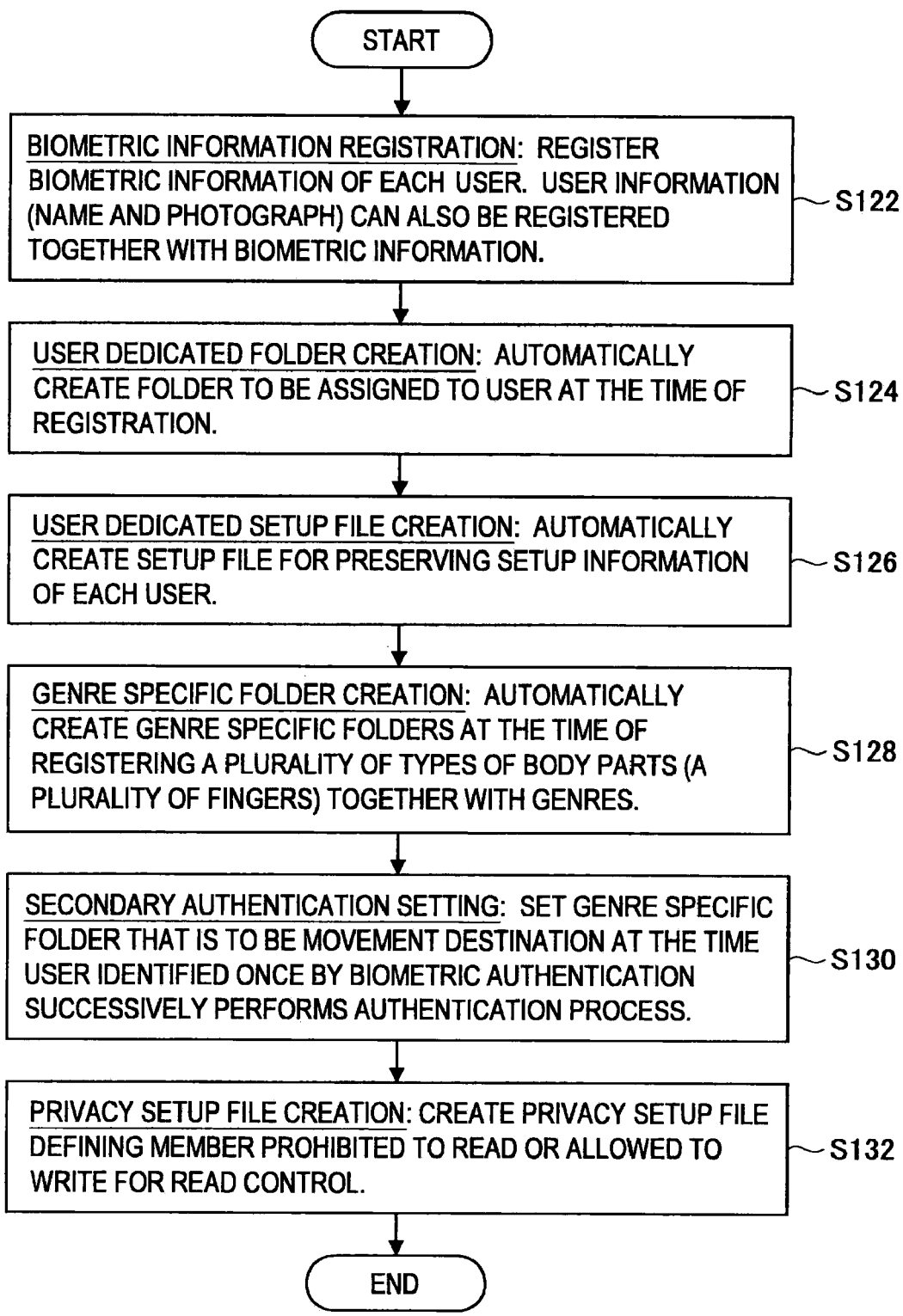
FIG. 8 is an explanatory diagram showing a flow of initial processes to be performed by a device of the present embodiment.

Here, referring to FIGS. 7 and 8, a process flow relating to the data management method of the present embodiment will be described. The data management method is realized by the electronic device 10 shown in FIG. 1. FIG. 7 is an explanatory diagram showing an overall flow of the process relating to the data management method of the present embodiment. FIG. 8 is an explanatory diagram showing a flow of initial processes of the process relating to the data management method of the present embodiment.

(Overall Flow)

First, reference will be made to FIG. 7. As shown in FIG. 7, first, when biometric information is acquired by the biometric authentication sensor 100, a user is identified by the user authentication unit 112 (S102). Next, the electronic device 10 switches an operation mode to a user dedicated mode for the user identified by the user authentication unit 112 (S104). The user dedicated mode here is an operation mode set for each user. For example, when the operation mode is switched to the user dedicated mode for the user U1, the display settings of a user interface or the setup information on the correspondence relationship between each body part and a folder attribute or the like is switched to that set by the user U1.

In case the electronic device 10 is an imaging device, when the operation mode is switched to the user dedicated mode for the user U1, a set value relating to an imaging property such as on/off of autofocus, the type of a recording format or the like is switched to that set by the user U1. On the other hand, in case the electronic device 10 is a music player, when the operation mode is switched to the user dedicated mode for the user U1, a set value relating to an acoustic property such as volume, acoustic effect or the like is switched to that set by the user U1.

Next, the electronic device 10 (folder management unit 120) moves the data storage location to the user dedicated folder of the user identified by the user authentication unit 112 (S106). Then, in case the same user successively inputs biometric information and a secondary authentication is performed, the electronic device 10 (body part identification unit 118, folder management unit 120) identifies the body part used at the time of the secondary authentication and determines a genre corresponding to the identified body part (S108). Although a genre is mentioned here as an example of the folder attribute, the type of a group or the like may be alternatively identified, for example. Next, the electronic device 10 (folder management unit 120) moves the data storage location to a folder corresponding to the body part (finger) identified by the secondary authentication (S110).

Next, the electronic device 10 (folder management unit 120) performs a privacy setting for the user identified by the user authentication unit 112 (S112). The privacy setting here means application of an access restriction to a folder created in the data memory unit 124, or hiding of a part of a menu items, folders, data or the like displayed on the display unit 132, for example. For example, an access restriction is applied to folders of users other than the user identified by the user authentication unit 112, or a display restriction is applied so that the folders are not displayed on the display unit 132. When the privacy setting is completed in this manner, the electronic device 10 ends the series of processes.

As described above, according to the data management method of the present embodiment, the data storage location is moved or a genre is set to a folder based on biometric authentication information. Thus, even if a user does not perform the folder creation operation, data transfer operation or the like, data is automatically stored in his/her own folder. As a result, data can be managed with ease. Also, the privacy setting is set to the folder of each user based on the result of the biometric authentication, and thus, the privacy of each user can be protected without any burdensome operations.

(Flow of Initial Processes)

Next, reference will be made to FIG. 8. The overall process illustrated in FIG. 7 relates mainly to the movement between folders. The process of movement between folders as described is only realized when an appropriate folder is already created in the data memory unit 124. According to the present embodiment, the folder creation is also realized by an automatic process, and thus, initial processes including the folder creation process will be described with reference to FIG. 8.

As shown in FIG. 8, first, biometric information is registered (S122). In step S122, the biometric information is registered by each user. At this time, user information such as the name of the user, a photograph or the like may also be registered together with the biometric information. The biometric information registered at this time is stored in the authentication information memory unit 114. Additionally, a biometric pattern that can be acquired by the biometric authentication sensor 100, such as a fingerprint, a vein pattern or the like, is registered as the biometric information, for example. Also, each user can register, at step S122, a plurality of body parts that can be acquired by the biometric authentication sensor 100 and that can be identified by the body part identification unit 118. Information on the body parts registered in this way are also held in the authentication information memory unit 114 or the body part identification unit 118.

Next, a user dedicated folder is created (S124). The process of step S124 is realized by the folder management unit 120. When a user is registered together with the biometric information in step S122, a folder to be assigned to the user is automatically created in the data memory unit 124. Then, a user dedicated setup file is automatically created (S126). The user dedicated setup file is a file for preserving the setup information for each user. Information on the user dedicated mode or the like is written in the user dedicated setup file.

Next, a genre specific folder is automatically created (S128). When a genre is associated with each of a plurality of types of body parts registered in step S122, folders corresponding to the respective genres are automatically created in the data memory unit 124. For example, when a genre is associated with each finger of the user U1, a folder for each genre is automatically created in the lower hierarchy of the user dedicated folder of the user U1. Then, setting for a secondary authentication is performed (S130). In step S130, the genre specific folder created in step S128 and a secondary authentication method are associated with each other.

As described above, the folder management unit 120 selects a genre specific folder based on the number of authentication times and the part information that are acquired in the secondary authentication. At this time, the correspondence relationship between the genre specific folder and the secondary authentication method associated in step S130 is referred to. For example, in case a method of a "thumb" in the second authentication operation and a "little finger" in the third authentication operation is associated with a genre "classical music," when this method is executed, the folder management unit 120 moves the data storage location to the genre specific folder corresponding to the "classical music."

When the secondary authentication setting is completed in this way, the electronic device 10 creates a privacy setup file (S132). In step S132, a privacy setup file defining a member prohibited to read or allowed to write is created. The folder management unit 120 refers to the privacy setup file created in step S132 and performs an access control on data and each folder created in the data memory unit 124. When the series of processes is over, the electronic device 10 ends the initial processes. The user dedicated folder and the genre specific folder are automatically created by this time. Also, in case a group setting or the like is to be performed, the registration of a group and a creation process for the folder of the registered group are included in the initial processes.

As described above, the biometric information is registered at the time of the registration of a user, and a folder of the user is automatically created along with the registration of the biometric information. Furthermore, a genre specific folder is automatically created at the time the user registers a body part and a genre is associated with the registered body part. A rule for moving between folders is determined by the secondary authentication method and the genre specific folder being associated with each other. With such initial processes being performed, the data sorting process or the automatic movement to a desired folder shown in FIG. 7 becomes possible. As a result, a user can easily put the data in order with small number of operational steps, and also, the operational burden of the user at the time of using the data can be significantly reduced.

3: Folder Structure

Figure 9:
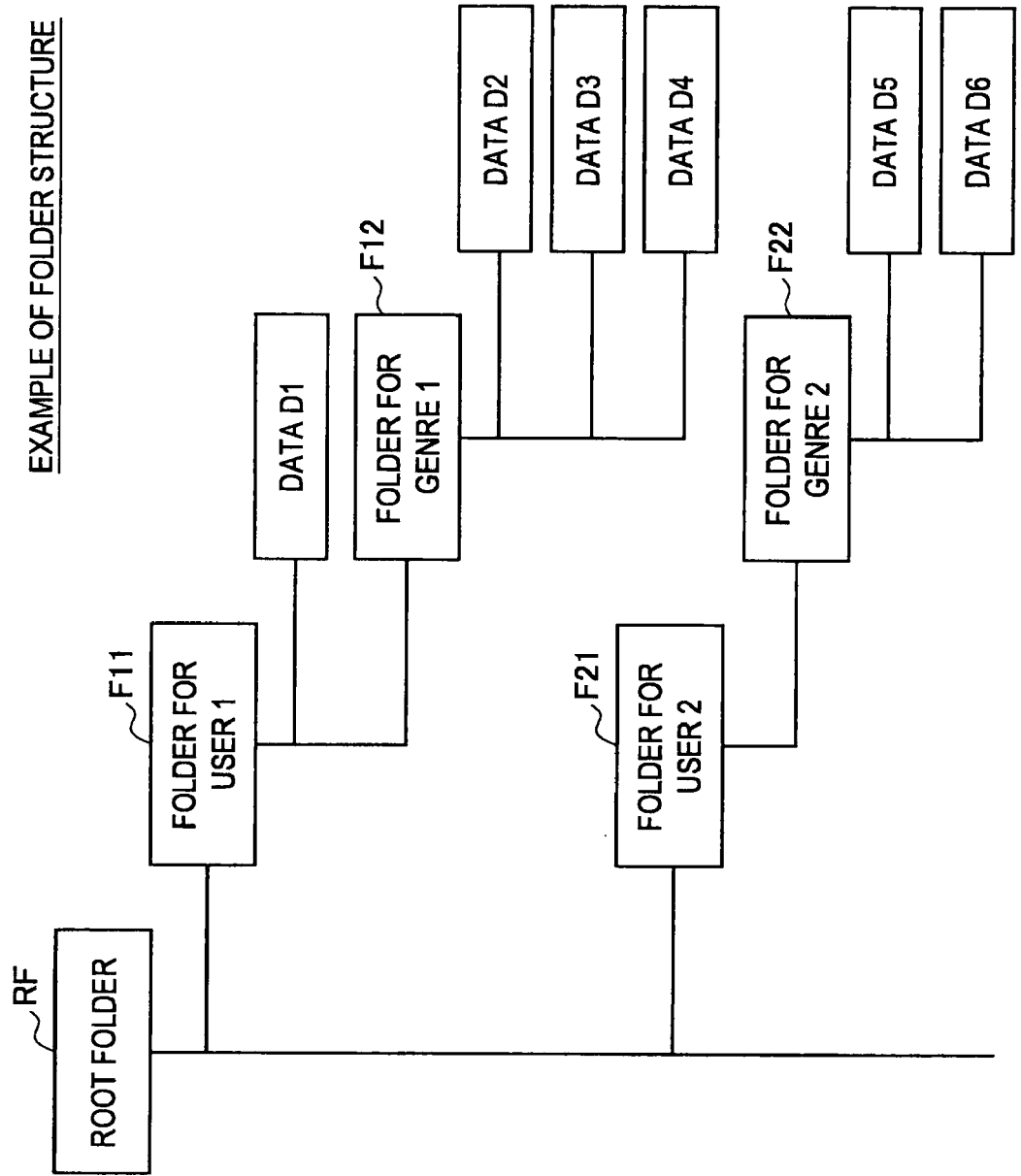
FIG. 9 is an explanatory diagram showing an example of a folder structure according to the present embodiment.
Figure 10:
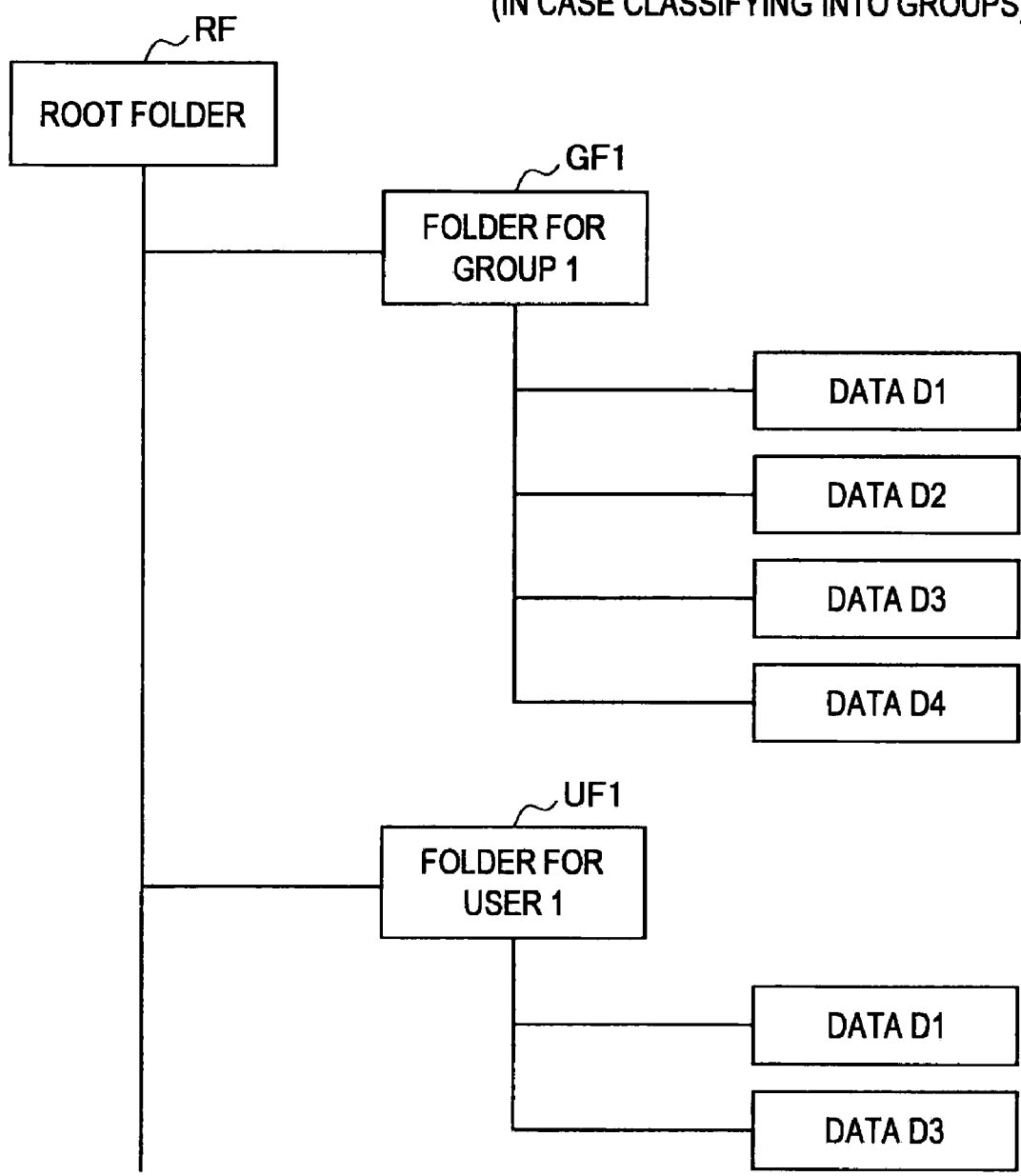
FIG. 10 is an explanatory diagram showing an example of the folder structure according to the present embodiment.
Figure 11:
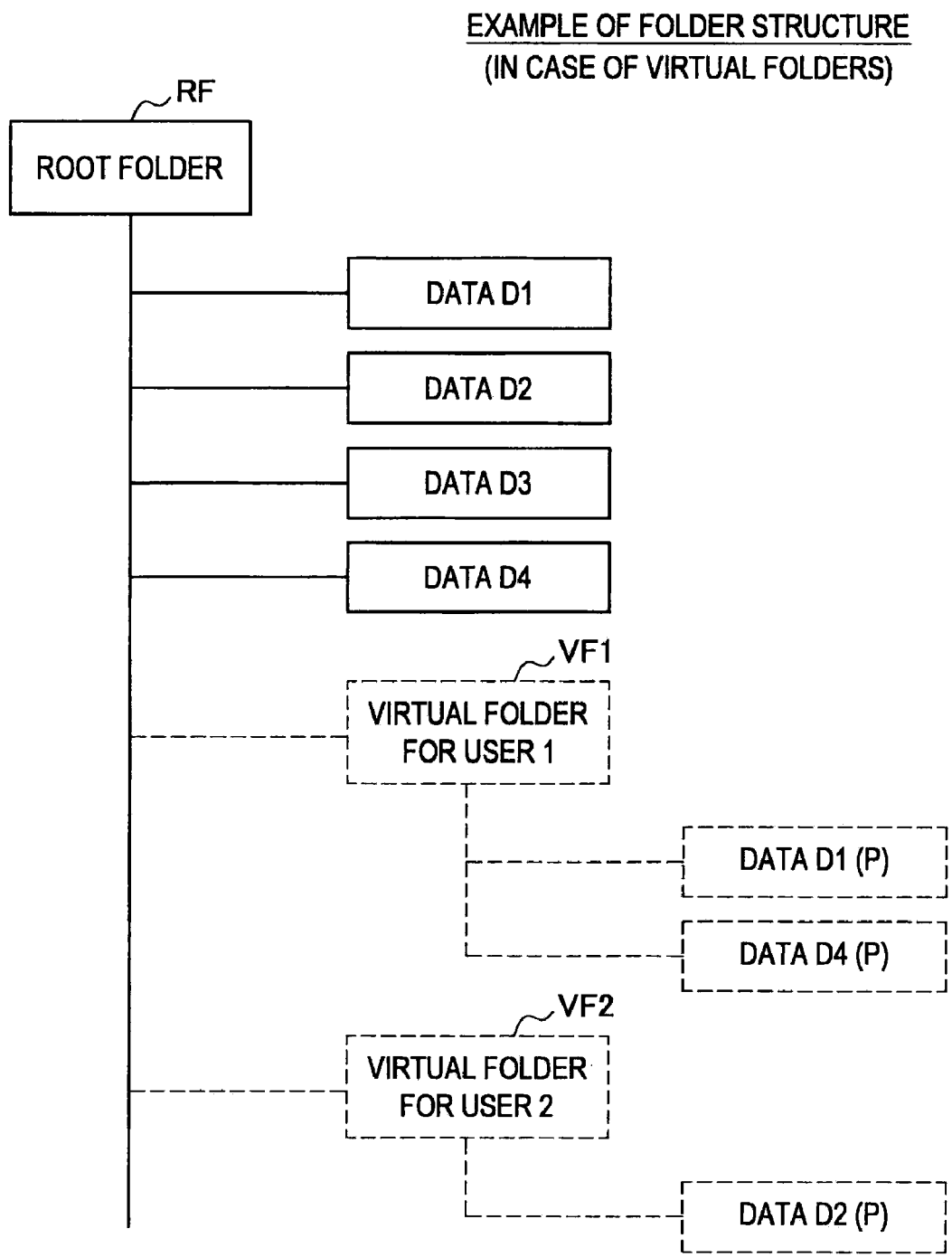
FIG. 11 is an explanatory diagram showing an example of the folder structure according to the present embodiment.

Here, referring to FIGS. 9 to 11, a folder structure created or used in the data management method according to the present embodiment will be described. FIG. 9 is an explanatory diagram showing an example of the folder structure for a case where a folder is created for each user and for each genre. FIG. 10 is an explanatory diagram showing an example of the folder structure for a case where a folder is created for each user and for each group. FIG. 11 is an explanatory diagram showing an example of the folder structure for a case where data is classified and stored by using virtual folders.

(Classification Based on User and Genre)

First, reference will be made to FIG. 9. As shown in FIG. 9, in the present embodiment, a folder is created for each user and for each genre at the time of registration of the biometric information or the like. The folder structure of the data memory unit 124 has a root folder RF in the highest hierarchy, and a folder for each user is created in a hierarchy immediately below. For example, when a user 1 registers biometric information, a folder F11 for user 1 is automatically created at the time of the registration. Also, when a user 2 registers biometric information, a folder F21 for user 2 is automatically created at the time of the registration.

Then, when body parts are registered by the user 1 and a genre 1 is associated with a body part, a folder F12 for genre 1 is automatically created in the lower hierarchy of the folder F11 for user 1. For example, when a biometric authentication is performed by the user 1, the user 1 is identified by the user authentication unit 112, and the data storage location is moved to the folder F11 for user 1 by the folder management unit 120. Furthermore, when the operation input unit 128 is operated by the user 1 and data D1 is acquired by the data acquisition unit 122, the data D1 is stored in the folder F11 for user 1.

Also, when a secondary authentication is performed by the user 1 with a body part that is already registered, the body part and the genre 1 are identified by the body part identification unit 118, and the data storage location is moved to the folder F12 for genre 1 by the folder management unit 120. Furthermore, when the operation input unit 128 is operated by the user 1 and data D2 is acquired by the data acquisition unit 122, the data D2 is stored in the folder F12 for genre 1.

Similarly, when body parts are registered by the user 2 and a genre 2 is associated with a body part, a folder F22 for genre 2 is automatically created in the lower hierarchy of the folder F21 for user 2. For example, when a biometric authentication is performed by the user 2, the user 2 is identified by the user authentication unit 112, and the data storage location is moved to the folder F21 for user 2 by the folder management unit 120.

Furthermore, when a secondary authentication is performed by the user 2 with a body part that is already registered, the body part and the genre 2 are identified by the body part identification unit 118, and the data storage location is moved to the folder F22 for genre 2 by the folder management unit 120. Furthermore, when the operation input unit 128 is operated by the user 2 and data D5 is acquired by the data acquisition unit 122, the data D5 is stored in the folder F22 for genre 2.

As described above, a user dedicated folder for each user and a genre dedicated folder are automatically created by the electronic device 10, and data are sorted into respective folders based on the authentication information of the user. As described above, this sorting process also is performed based on the biometric authentication result for each user, and thus, a user does not have to perform a complicated operation with many operational steps.

(Classification into Groups)

Next, reference will be made to FIG. 10. As already described, in the present embodiment, a group can be registered, and a user can belong to the registered group. Also, the above-described electronic device 10 can select a belonging group of a user identified by a biometric authentication, and can sort the data acquired by the user's operation into a folder of the belonging group. In case such group setting is performed, a folder structure as illustrated in FIG. 10 is automatically created.

In this case, the folder structure of the data memory unit 124 has a root folder RF in the highest hierarchy, and a folder for each user is created in a hierarchy immediately below. For example, when a user 1 registers biometric information, a folder UF1 for user 1 is automatically created at the time of the registration. Also, when a group 1 is registered, a folder GF1 for group 1 is automatically created at the time of the registration. Here, it is assumed that the group 1 is the belonging group of the user 1.

In this case, when a biometric authentication is performed by the user 1, the user 1 is identified by the user authentication unit 112, and the data storage location is moved to the folder UF1 for user 1 by the folder management unit 120. Furthermore, when the operation input unit 128 is operated by the user 1 and data D1 is acquired by the data acquisition unit 122, the data D1 is stored in the folder UF1 for user 1. At this time, the group 1 is selected by the group selection unit 126 as the belonging group of the user 1, and the data D1 is stored also in the folder GF1 for group 1 by the data acquisition unit 122. As a result, the data D1 is stored in the folder GF1 for group 1 and the folder UF1 for user 1.

However, if it is set to store data only in the folder GF1 for group 1 or the folder UF1 for user 1, the data acquisition unit 122 determines the data storage location based on the setting. In this manner, by separating a folder for a group and a folder for a user and individually setting the data storage location, variations of the privacy setting can be increased or the search performance at the time of referring to data can be improved.

(Classification Based on Virtual Folder: Extension 1)

Next, reference will be made to FIG. 11. In the above explanation, a management method for a real folder created in the data memory unit 124 has been assumed. However, the technology according to the present embodiment can be extended to a data management method for a virtual folder. The virtual folder here is, unlike a real folder in which data is actually stored, an index with which a data reference location (hereinafter, "pointer") is associated.

In the example of FIG. 11, a virtual folder VF1 for user 1 is provided in the data memory unit 124, and pointers of data D1 and data D4 (data D1(P), data D4(P)) are associated with the virtual folder VF1 for user 1. However, the actual data D1 and D4 are stored in a root folder RF. In this case, the electronic device 10 can display the virtual folder VF1 for user 1 as the folder for the user 1, or can display the actual data D1 and D4 by referring to the data D1(P) and the data D4(P). That is, although data is managed within the electronic device 10 by using virtual folders, a folder, data or the like is displayed to the user as in the same manner as when data is managed by using real folders.

In case of using a virtual folder as described, the functional configuration (refer to FIG. 1) of the electronic device 10 is changed as follows. As described above, the folder management unit 120 manages folders based on the user information input from the user authentication unit 112, the number of authentication times input from the authentication times counter 116, and the part information input from the body part identification unit 118. For example, the folder management unit 120 was configured to automatically create a folder (real folder) for user 1 at the time a user 1 registered biometric information. However, in case of using a virtual folder, the configuration of the folder management unit 120 is changed so as to create a virtual folder VF1 for user 1 at the time the user 1 registers biometric information.

Also, the folder management unit 120 was configured to move the data storage location to a folder of the user 1 at the time the user 1 performed a first authentication operation, based on the user information on the user identified by the user authentication unit 112. However, in case of using the virtual folder, the configuration of the folder management unit 120 is changed in such a way that the data storage location is not moved from a given folder (for example, the root folder RF). However, at the time the user 1 performs a first authentication operation, the folder management unit 120 creates a pointer of the data acquired by the data acquisition unit 122 in the virtual folder VF1 for user 1 based on the user information on the user identified by the user authentication unit 112.

Thus, when a first authentication operation is performed by the user 1 and the user information of the user 1 is input, the folder management unit 120 inputs information on the virtual folder VF for user 1 to the data acquisition unit 122. When the information on the virtual folder VF for user 1 is input, the data acquisition unit 122 stores the acquired data in a given folder existing in the data memory unit 124, and further, associates the pointer of the data with the virtual folder VF1 for user 1. Furthermore, when a first authentication operation is performed by a user 2, the same processes as those described above are performed, and a folder structure as illustrated in FIG. 11 is formed.

Additionally, although a virtual folder for group and a genre specific virtual folder to be created in the lower hierarchy of the virtual folder for user are not shown in the example of FIG. 11, the same can be said for these folders. For example, when a second authentication operation is performed by the user 1 by using a "thumb," information such as "user information=user 1, number of authentication times=2, part information=thumb" is input to the folder management unit 120. For example, when part information indicating a "thumb" is input according to the second authentication operation, it is assumed that "genre=pops" is identified. In this case, the folder management unit 120 creates a genre specific folder corresponding to "pops."

At this time, the folder management unit 120 creates the genre specific folder for the genre "pops" in the lower hierarchy of the virtual folder VF1 for user 1. Furthermore, the folder management unit 120 inputs information on the genre specific virtual folder corresponding to "pops" to the data acquisition unit 122. When the information on the genre specific virtual folder is input, the data acquisition unit 122 stores acquired data in a given folder, and also, associates the pointer of the data with the genre specific virtual folder for the genre "pops." In this manner, a virtual folder is automatically created the same way as a real folder, and a pointer of data is associated with the virtual folder.

Also, when a group is registered, the folder management unit 120 creates a group specific virtual folder for the registered group. Furthermore, at the time of associating a pointer of data with the virtual folder for user of a user, the data acquisition unit 122 associates the pointer with a group specific virtual folder for a registered group to which the user belongs. For example, when a user 1 belonging to a group 1 performs a first authentication operation, the group 1 is identified by the group selection unit 126, and group information on the group 1 is input to the data acquisition unit 122. When the group information on the group 1 is input, the data acquisition unit 122 stores the acquired data in a given folder, and also, associates the pointer of the data with a virtual folder for user of the user 1 and a virtual folder for group of the group 1.

As described above, by changing a part of the function configuration of the above-described electronic device 10, the data management method using a virtual folder can be achieved. Using a virtual folder in this manner enables to limit the folders in which data are to be stored to a small number of specific folders, and data transfer and reorganization can be made easy when transferring all or most of the data to a PC or the like and reorganizing the data on the PC or the like. Also, when classifying into more specific groups or genres, data storage locations are not scattered, and thus, data search performance can be improved. Furthermore, since the same real data can be prevented from being redundantly stored in a plurality of folders, the efficiency of memory utilization can be improved. Also, even if a folder is erroneously deleted or changed, the real data itself is not deleted, and thus, the data security can be improved.

4: Display Method for Data

Figure 12:
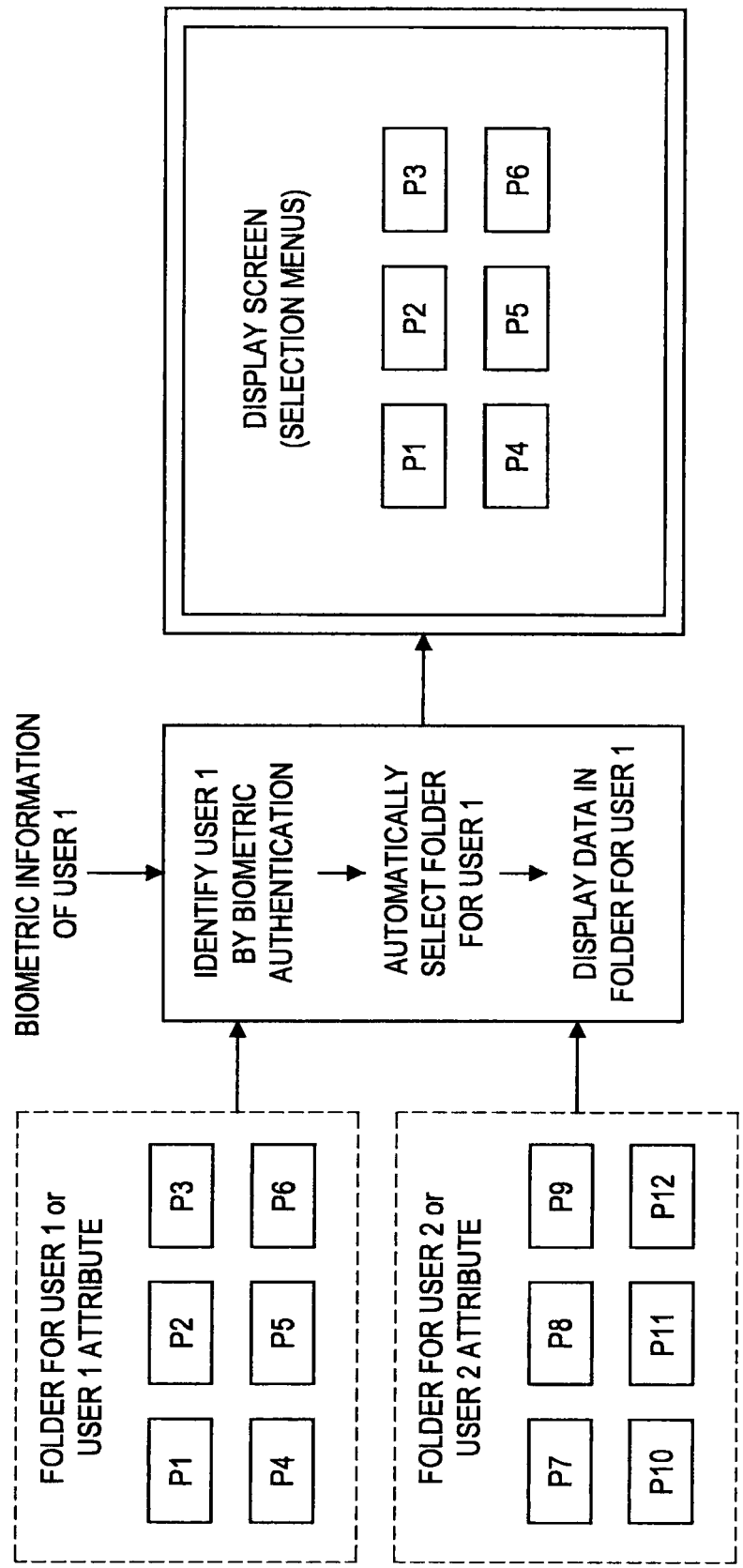
FIG. 12 is an explanatory diagram showing an example of a data display method according to the present embodiment.

Next, referring to FIG. 12, a display method for data managed by the data management method according to the present embodiment will be described. FIG. 12 is an explanatory diagram showing an example of a display method for data managed by the data management method according to the present embodiment. In the explanation above, the automatic creation process of folders and automatic sorting process of data using the biometric authentication have been described. Also, an explanation has been made for a case where the automatic processes are extended to be used at the time of the data execution or reproduction. Now, a concrete explanation will be given on a display method for folder and data, and also, the extension to a data management method using attribute information will be described.

(Display Method for Data)

For example, as shown in FIG. 12, it is assumed that a folder for user 1 and a folder for user 2 are created in the data memory unit 124. Furthermore, it is assumed that a plurality of pieces of data P1 to P6 are stored in the folder for user 1 and a plurality of pieces of data P7 to P12 are stored in the folder for user 2. "User 1 Attribute" and "User 2 Attribute" are shown in FIG. 12, and these will be described later.

When an authentication operation is performed by a user 1 in this state, the user 1 is identified by the user authentication unit 112 based on the biometric information of the user 1. Then, the folder of the user 1 identified by the user authentication unit 112 is automatically selected by the folder management unit 120. Here, when a display operation is performed by the user 1 by using the operation input unit 128, data in the folder for user 1 is displayed by the display control unit 130. For example, a list of data in the folder for user 1 is displayed in thumbnails as selection menus. Then, when desired data is selected by the user 1, the content of the data is displayed by the display control unit 130.

(Data Management Method Using Attribute Information: Extension 2)

As described above, with data being managed by using folders, data is organized for each user or for each genre, and thus, when displaying the data, data search performance can be improved. In the explanation above, the data management method using folders have mainly been described. However, the feature of this data management method lies in that a folder is automatically created or is automatically selected based on the user information or the like obtained by a biometric authentication.

The technological extension to a configuration of using virtual folders has already been described. The technology is further extended, and a method of assigning attribute information (equivalent to a virtual folder) to each data instead of associating the data to a virtual folder will be described. The attribute information here includes information on a user, information on a genre, group information or the like. That is, the information equivalent to the above-described folder attribute is the attribute information mentioned here.

The functional configuration (refer to FIG. 1) of the electronic device 10 is changed as follows in case of using a data management method based on the attribute information mentioned above. As described, the folder management unit 120 manages folders based on the user information input from the user authentication unit 112, the number of authentication times input from the authentication times counter 116 and the part information input from the body part identification unit 118. For example, the folder management unit 120 was configured to automatically create a folder for user 1 in the data memory unit 124 at the time the user 1 registered the biometric information. However, when using the attribute information, the folder management unit 120 does not create a folder for each user.

Also, the folder management unit 120 was configured to move the data storage location to a folder of the user 1 based on the user information on the user identified by the user authentication unit 112 at the time the user 1 performed a first authentication operation. However, in case of using the attribute information, the folder management unit 120 inputs the attribute information for the user 1 that is equivalent to the above-described folder attribute to the data acquisition unit 122. When the attribute information is input, the data acquisition unit 122 stores the acquired data in a given folder in the data memory unit 124, and further, assigns the attribute information to the data.

Also, when a second authentication operation is performed by the user 1 by using a "thumb," information such as "user information=user 1, number of authentication times=2, part information=thumb" is input to the folder management unit 120. For example, when part information indicating a "thumb" is input according to the second authentication operation, it is assumed that "genre=pops" is identified. In this case, the folder management unit 120 inputs to the data acquisition unit 122 the attribute information indicating "user information=user 1, genre information=pops." When the attribute information is input, the data acquisition unit 122 stores the acquired data in a given folder in the data memory unit 124, and further, assigns the attribute information to the data.

Also, when a user 1 belonging to a group 1 performs a first authentication operation, the group 1 is identified by the group selection unit 126, and group information on the group 1 is input to the data acquisition unit 122 as the attribute information. When the group information on the group 1 is input, the data acquisition unit 122 stores the acquired data in a given folder, and also, assigns to the data the attribute information input from the folder management unit 120 and the group information input from the group selection unit 126 as the attribute information.

As described above, since attribute information determined based on the biometric authentication is assigned to each data, data is automatically classified based on the attribute information of each data. As a result, as shown in FIG. 12, data can be searched by a substantially same operation as that in case of classifying based on folders. According to this method, pieces of the attribute information are successively added based on the secondary authentications as described above, and thus, data can be managed as if the data are managed in folders having a hierarchical structure. On the other hand, the folder structure does not become complicated in the data memory unit 124 even if the number of users increases or classification into more specific genres is performed, and thus, data transfer or search can be performed with ease.

5: Hardware Configuration Example of Electronic Device 10

Figure 13:
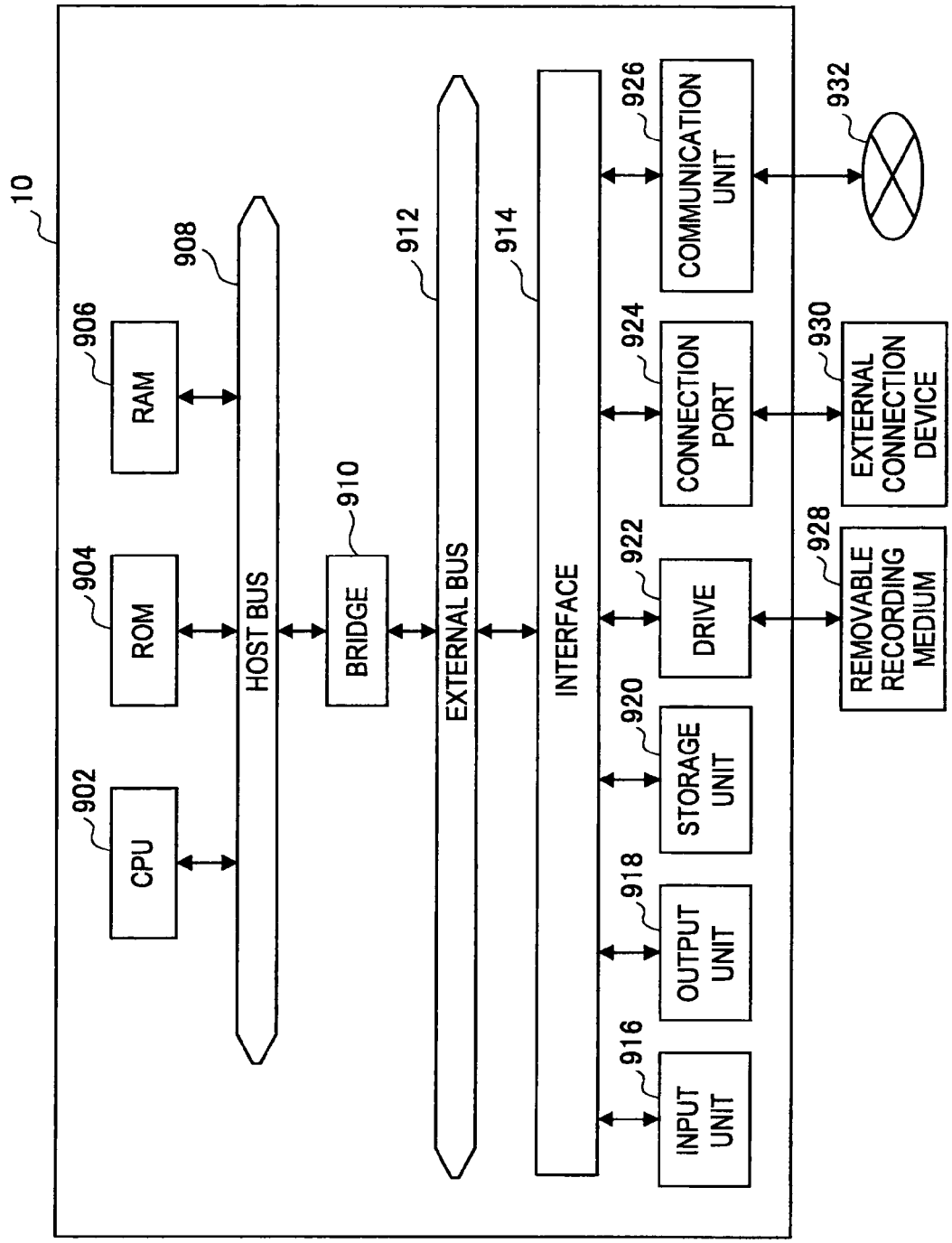
FIG. 13 is an explanatory diagram showing a hardware configuration example of the electronic device according to the present embodiment.

The function of each structural element of the above-described electronic device 10 can be realized, for example, by using the hardware configuration shown in FIG. 13. For example, the function of each structural element is realized by controlling the information processing apparatus shown in FIG. 13 by using a computer program. The mode of the information processing apparatuses shown is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 13, the information processing apparatus is configured mainly from a CPU 902, a ROM 904, a RAM 906, a host bus 908, a bridge 910, an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 which can perform high-speed data transmission. On the other hand, the host bus 908 is connected to the external bus 912 whose data transmission speed is relatively low through the bridge 910, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device to store various data. The storage unit 920 is, for example, a magnetic storage device such as a hard disk drive (HDD), a semiconductor storage device, an optical storage device, or a magneto-optical storage device.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, a CompactFlash (CF; registered trademark), a memory stick, or an SD memory card. As a matter of course, the removal recording medium 928 may be, for example, an IC card on which a non-contact IC chip is mounted or an electronic device. The SD memory card is an abbreviation for Secure Digital memory card. Moreover, the IC is an abbreviation for Integrated Circuit.

The connection port 924 is a port such as an USB port, an IEEE 1394 port, a SCSI, an RS-232C port, or a port for connecting an external connection device 930 such as an optical audio terminal. The external connection device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

6: Conclusion

Lastly, the functional configuration of the electronic device of the present embodiment, and the effects obtained by the functional configuration will be briefly described.

First, the functional configuration of the electronic device according to the present embodiment can be expressed as follows. The electronic device includes a biometric authentication sensor, a user identification unit and a data storage unit as described below. The user authentication unit 112 is an example of the user identification unit. Also, the folder management unit 120, the data acquisition unit 122 and the data memory unit 124 are examples of the data storage unit.

The biometric authentication sensor is for detecting a feature quantity of a living body. Also, the user identification unit is for identifying a user based on the feature quantity detected by the biometric authentication sensor at the time a specific operation is performed by the user. Furthermore, the data storage unit is for storing data acquired according to the specific operation in a specific folder corresponding to the user identified by the user identification unit.

As described, by identifying a user by the biometric information acquired at the time a specific operation is performed by the user, the operating user can be automatically identified. For example, even if a user 1 logs in and a user 2 different from the user 1 performs an operation, the user 2 who has performed the operation is identified as the user. In case information on a user is to be used for the purpose of managing data for each user as with the present embodiment, data is desirably managed based on information not on the logged-in user but on the operating user.

For this reason, a structure is proposed in the present embodiment for identifying a user by the biometric authentication and storing in the folder of the identified operating user the data obtained as a result of the operation. By adopting this structure, data will be orderly arranged in the folder of the operating user, and the data search performance will be improved. Furthermore, even if the operating user does not perform the movement process of the data storage location, data will be automatically stored in a desired folder, and thus, data can be easily organized and stored with small number of operational steps.

The electronic device may further include a detection times counter for counting a number of times a feature quantity of a same user is successively detected by the biometric authentication sensor at the time the specific operation is performed, based on a result of identification by the user identification unit, and a folder selection unit for selecting a specific folder in which the data is to be stored, according to the number of detection times counted by the detection times counter. In this case, the data storage unit stores the data in the specific folder selected by the folder selection unit. Additionally, the authentication times counter 116 is an example of the detection times counter. Also, the folder management unit 120 is an example of the folder selection unit.

With this configuration, when the same user subsequently performs the biometric operation, it is determined to be a secondary authentication. Furthermore, moving the data storage location, which is a folder, according to the number of times the user performed the authentication operation allows to set a folder attribute to the number of times of the authentication operations. For example, if genre is associated with the number of times of the authentication operations, data is automatically sorted into a genre specific folder according to the number of times of the authentication operations, and the user does not have to perform a genre selection operation or a movement operation to a genre specific folder and the operational steps can be reduced.

Furthermore, the electronic device may further include a body part identification unit for identifying a body part based on the feature quantity detected by the biometric authentication sensor. In this case, in case the number of detection times counted by the detection times counter is N (N≧2), the folder selection unit selects the specific folder according to the body part identified by the body part identification unit based on a feature quantity detected k-th (k=2, . . . , N) by the biometric authentication sensor.

With this configuration, it becomes possible to take into account, at the time of selecting a folder according to the result of the secondary authentication, information on the body part used for the secondary authentication, making it possible to select a larger number of more specific folder attributes, such as a genre, a group and the like. Also, since the folder attribute can be changed according to the body part, a more specific folder attribute can be selected with less operational steps compared to a case of changing the folder attribute based on only the number of times of the secondary authentications.

Furthermore, in case the number of detection times counted by the detection times counter is N (N≧3), the folder selection unit selects the specific folder according to a combination and an order of N body parts sequentially identified by the body part identification unit. In this manner, when the number of times of the secondary authentications is 2 or more, the combination of body parts or the order of body parts used for the authentication can be taken into account. Thus, by associating the folder attribute with the combination or order as described, a more specific folder attribute can be selected with less operational steps.

Furthermore, the electronic device may further include a group selection unit for selecting, based on group information defining a correspondence relationship between each user and a specific group, the specific group corresponding to the user identified by the user identification unit. In this case, the data storage unit stores data acquired according to the specific operation in a specific folder corresponding to the specific group selected by the group selection unit. In this manner, the technology of the present embodiment enables to sort by group besides sorting by genre. For example, with folders being separate for each group such as "family," "friend" or "colleague," the data search performance at the time of using data or transferring the data to someone else is improved.

Furthermore, the electronic device may further include a restriction setting unit for setting a display restriction or an operation restriction on a specific folder and data in the specific folder, the specific folder corresponding to a user other than the user identified by the user identification unit. As described, by using the technology according to the present embodiment, data can be classified and stored in folders having various folder attributes. Thus, by setting the access restriction or the display restriction on each folder, public data and private data can be easily separated, and the privacy of each user can be easily protected.

Furthermore, the data storage unit may store data acquired according to the specific operation in a common folder common to all users, and associates information on the data stored in the common folder with a specific virtual folder corresponding to the user identified by the user identification unit.

With this configuration, when transferring all or most of the data at one time regardless of the folder attribute, the transfer operation can be performed while referring only to common folders, and the operability can be greatly improved. For example, when data is desired to be transferred to a PC or the like and be managed therein, the folder structure used for data management at the electronic device may cause an inconvenience. However, in case of using a virtual folder as described above, since data are not scattered, the transfer and reorganization of the data become easy. Furthermore, since the data is not redundantly stored in a plurality of folders, memory resources can be efficiently used.

Furthermore, the feature quantity of a living body is a feature quantity enabling to uniquely identify a user based on one or a combination of a vein pattern, a fingerprint and an iris pattern, for example. In the present embodiment, these pieces of information can be used as the biometric information. Of course, information on other body parts can also be used.

Furthermore, the electronic device may further include an imaging unit for capturing an image of a subject, and an operation button for making the imaging unit perform an image capturing process. In this case, the user identification unit identifies a user based on the feature quantity detected by the biometric authentication sensor at a time the operation button is operated by the user, and the data storage unit stores data of the image that is captured by the imaging unit according to the operation of the operation button in a specific folder corresponding to the user identified by the user identification unit. That is, the electronic device according to the present embodiment can be applied to an imaging device. When applying to the imaging device, a biometric authentication sensor is preferably provided at a position where a body part of the user will contact or will be brought into proximity at the time of pressing a shutter button.

Furthermore, the electronic device may further include a data acquisition unit for acquiring content data, and an operation button for making the data acquisition unit perform a data acquisition process. In this case, the user identification unit identifies a user based on the feature quantity detected by the biometric authentication sensor at a time the operation button is operated by the user, and the data storage unit stores the content data acquired by the data acquisition unit according to the operation of the operation button in a specific folder corresponding to the user identified by the user identification unit. That is, the technology according to the present embodiment can be applied to a content player such as a music player or a video player. Of course, it can also be applied to a PC or other electronic devices in general.

Furthermore, the electronic device may also be configured to include a biometric authentication sensor for detecting a feature quantity of a living body, a user identification unit for identifying a user based on the feature quantity detected by the biometric authentication sensor at a time a specific operation is performed by the user, an attribute assigning unit for assigning attribute information for the user identified by the user identification unit to data acquired according to the specific operation, and a data storage unit for storing in a specific folder the data to which the attribute information for the user is assigned by the attribute assigning unit. Additionally, the folder management unit 120, the data acquisition unit 122 and the group selection unit 126 are examples of the attribute assigning unit.

Furthermore, the electronic device may further include a display unit capable of displaying the data and information relating to the specific folder, and a display control unit for making the display unit display one or both of the specific folder and the data stored in the specific folder, the specific folder corresponding to the user identified by the user identification unit based on the feature quantity detected by the biometric authentication sensor at a time a display operation of the data is performed. In this manner, the technology according to the present embodiment can also be applied to a method of displaying data. With this configuration, even if a transfer operation or the like to a desired folder is not performed by a user, automatic transfer to the desired folder becomes possible.

It should be understood by those skilled in the art that various modifications, combinations, sub-combinations and alterations may occur depending on design requirements and other factors insofar as they are within the scope of the appended claims or the equivalents thereof.

For example, in the above-described embodiment, a configuration is described where whether it is a secondary authentication or not is automatically determined based on the number of authentication times. However, the present embodiment is not limited to such, and it may be configured to determine that the content of an authentication operation is a secondary authentication when the authentication operation is performed after a secondary authentication start switch is pressed. Also, it may be configured so that information on body parts (finger and the like) that can be used for the secondary authentication and information on the genre corresponding to each body part are displayed at the time the switch is pressed. With this configuration, a user does not have to remember the operation for the secondary authentication, and the convenience for the user can be improved.

Furthermore, with the electronic device 10 according to the above-described embodiment, switching between various folder attributes or transfer between folders takes place depending on the combination of body parts or the number of authentication operation times for the secondary authentication. Thus, an operation that is frequently performed by a user, information registered by each user, or the like is preferably recorded as a setup file, and the details of the last operation are preferably recorded as a setup file. With this configuration, the setup file can be read and used when the same user uses the electronic device 10 some other day, and thus, the user can be saved the trouble of inputting the same information again. For example, the setup file is created for each user, and the setup file of a user identified by the biometric information at the time an authentication operation is performed by the user is read.

The present application contains subject matter related to that disclosed in Japanese Priority Patent Application JP 2009-56975 filed in the Japan Patent Office on Mar. 10, 2009, the entire content of which is hereby incorporated by reference.

What is claimed is:

1. An electronic device having a biometric authentication function, comprising:
    a biometric authentication sensor for detecting a feature quantity of a living body;
    a user identification unit for identifying a user based on the feature quantity detected by the biometric authentication sensor at a time a specific operation is performed by the user;
    a body part identification unit for identifying a body part based on the feature quantity detected by the biometric authentication sensor, wherein, in case the number of detection times counted by the detection times counter is N (N≧2), the folder selection unit selects the specific folder according to the body part identified by the body part identification unit based on a feature quantity detected k-th (k=2, . . . , N) by the biometric authentication sensor; and
    a data storage unit for storing data acquired according to the specific operation in a specific folder corresponding to the user identified by the user identification unit.

2. The electronic device having a biometric authentication function according to claim 1, further comprising:
    a detection times counter for counting a number of times a feature quantity of a same user is successively detected by the biometric authentication sensor at the time the specific operation is performed, based on a result of identification by the user identification unit; and
    a folder selection unit for selecting a specific folder in which the data is to be stored, according to the number of detection times counted by the detection times counter, wherein the data storage unit stores the data in the specific folder selected by the folder selection unit.

3. The electronic device having a biometric authentication function according to claim 1, wherein,
    in case the number of detection times counted by the detection times counter is N (N≧3), the folder selection unit selects the specific folder according to a combination and an order of N body parts sequentially identified by the body part identification unit.

4. The electronic device having a biometric authentication function according to claim 1, further comprising:
    a group selection unit for selecting, based on group information defining a correspondence relationship between each user and a specific group, the specific group corresponding to the user identified by the user identification unit,
    wherein
    the data storage unit stores data acquired according to the specific operation in a specific folder corresponding to the specific group selected by the group selection unit.

5. The electronic device having a biometric authentication function according to claim 1, further comprising:
    a restriction setting unit for setting a display restriction or an operation restriction on a specific folder and data in the specific folder, the specific folder corresponding to a user other than the user identified by the user identification unit.

6. The electronic device having a biometric authentication function according to claim 1, wherein
    the data storage unit stores data acquired according to the specific operation in a common folder common to all users, and associates information on the data stored in the common folder with a specific virtual folder corresponding to the user identified by the user identification unit.

7. The electronic device having a biometric authentication function according to claim 1, wherein
    the feature quantity of a living body is a feature quantity enabling to uniquely identify a user based on one or a combination of a vein pattern, a fingerprint and an iris pattern.

8. The electronic device having a biometric authentication function according to claim 1, further comprising:
    an imaging unit for capturing an image of a subject; and
    an operation button for making the imaging unit perform an image capturing process,
    wherein
    the user identification unit identifies a user based on the feature quantity detected by the biometric authentication sensor at a time the operation button is operated by the user, and the data storage unit stores data of the image that is captured by the imaging unit according to the operation of the operation button in a specific folder corresponding to the user identified by the user identification unit.

9. The electronic device having a biometric authentication function according to claim 1, further comprising:
a data acquisition unit for acquiring content data; and
an operation button for making the data acquisition unit perform a data acquisition process,
wherein
the user identification unit identifies a user based on the feature quantity detected by the biometric authentication sensor at a time the operation button is operated by the user, and
the data storage unit stores the content data acquired by the data acquisition unit according to the operation of the operation button in a specific folder corresponding to the user identified by the user identification unit.

10. An electronic device having a biometric authentication function, comprising:
a biometric authentication sensor for detecting a feature quantity of a living body;
a user identification unit for identifying a user based on the feature quantity detected by the biometric authentication sensor at a time a specific operation is performed by the user;
a body part identification unit for identifying a body part based on the feature quantity detected by the biometric authentication sensor, wherein, in case the number of detection times counted by the detection times counter is N (N≧2), the folder selection unit selects the specific folder according to the body part identified by the body part identification unit based on a feature quantity detected k-th (k=2, ..., N) by the biometric authentication sensor;
an attribute assigning unit for assigning attribute information for the user identified by the user identification unit to data acquired according to the specific operation; and
a data storage unit for storing in a specific folder the data to which the attribute information for the user is assigned by the attribute assigning unit.

11. The electronic device having a biometric authentication function according to claim 1, further comprising:
a display unit capable of displaying the data and information relating to the specific folder; and
a display control unit for making the display unit display one or both of the specific folder and the data stored in the specific folder, the specific folder corresponding to the user identified by the user identification unit based on the feature quantity detected by the biometric authentication sensor at a time a display operation of the data is performed.

12. The electronic device having a biometric authentication function according to claim 10, further comprising:
a display unit capable of displaying the data and information relating to the specific folder; and
a display control unit for making the display unit display one or both of the specific folder and the data stored in the specific folder, the specific folder corresponding to the user identified by the user identification unit based on the feature quantity detected by the biometric authentication sensor at a time a display operation of the data is performed.

13. A data management method comprising the steps of:
identifying, by using a biometric authentication sensor for detecting a feature quantity of a living body, a user based on the feature quantity detected by the biometric authentication sensor at a time a specific operation is performed by the user;
identifying a body part based on the feature quantity detected by the biometric authentication sensor, wherein, in case the number of detection times counted by the detection times counter is N (N≧2), the folder selection unit selects the specific folder according to the body part identified by the body part identification unit based on a feature quantity detected k-th (k=2, ..., N) by the biometric authentication sensor; and
storing data acquired according to the specific operation in a specific folder corresponding to the user identified in the step of identifying.

14. A data management method comprising the steps of:
identifying, by using a biometric authentication sensor for detecting a feature quantity of a living body, a user based on the feature quantity detected by the biometric authentication sensor at a time a specific operation is performed by the user;
identifying a body part based on the feature quantity detected by the biometric authentication sensor, wherein, in case the number of detection times counted by the detection times counter is N (N≧2), the folder selection unit selects the specific folder according to the body part identified by the body part identification unit based on a feature quantity detected k-th (k=2, ..., N) by the biometric authentication sensor;
assigning attribute information for the user identified in the step of identifying to data acquired according to the specific operation; and
storing in a specific folder the data to which the attribute information for the user is assigned in the step of assigning.

* * * * *